US009495712B2

(12) United States Patent
Quoc et al.

(10) Patent No.: US 9,495,712 B2
(45) Date of Patent: Nov. 15, 2016

(54) SOCIAL NAMESPACE ADDRESSING FOR NON-UNIQUE IDENTIFIERS

(75) Inventors: Michael Quoc, San Francisco, CA (US); Dan Wascovich, San Francisco, CA (US);
(Continued)

(73) Assignee: Yahoo! Inc., Sunnyvale, CA (US)

(*) Notice: Subject to any disclaimer, the term of this patent is extended or adjusted under 35 U.S.C. 154(b) by 745 days.

(21) Appl. No.: 13/214,043

(22) Filed: Aug. 19, 2011

(65) Prior Publication Data
US 2011/0302263 A1    Dec. 8, 2011

Related U.S. Application Data

(63) Continuation of application No. 11/555,247, filed on Oct. 31, 2006, now Pat. No. 8,006,190.

(51) Int. Cl.
*G06Q 50/00* (2012.01)
*H04L 12/58* (2006.01)
(Continued)

(52) U.S. Cl.
CPC ............. *G06Q 50/01* (2013.01); *G06Q 10/10* (2013.01); *H04L 12/588* (2013.01); *H04L 51/28* (2013.01);
(Continued)

(58) Field of Classification Search
CPC ................. G06Q 50/01; G06Q 10/107; H04L 67/146; H04L 12/588; H04L 51/28; H04L 51/32
(Continued)

(56) References Cited

U.S. PATENT DOCUMENTS 5,333,317 A    7/1994  Dann
5,923,848 A    7/1999  Goodhand et al.
(Continued)

FOREIGN PATENT DOCUMENTS

GB    2409300 A  *  6/2005  ............. G06Q 50/01
JP    2004126739 A    4/2004
(Continued)

OTHER PUBLICATIONS

Bardram, Jakob E. and Hansen, Thomas R.; "The AWARE Architecture: Supporting Context-Mediated Social Awareness in Mobile Cooperation;" CSCW '04, vol. 6, Issue 3; pp. 192-201; Nov. 6-10, 2004; ACM 1-58113-810-5/04/0011.*
(Continued)

*Primary Examiner* — Eric Wiener
(74) *Attorney, Agent, or Firm* — James J. DeCarlo; Greenberg Traurig, LLP

(57) ABSTRACT

A device, system, and method are directed towards enabling a user to disambiguate an identity of a member included in a user's social network (USN), and towards enabling an operation to be performed based on information about the member. The USN is determined. The NID of the member is received. If the NID is non-unique within the USN, member distinctions are determined for members in the USN who are associated with the same NID. The member distinctions are sent to the user. The user makes a selection of one of the members associated with one of the member distinctions. Based on the selection, information about the selected member is received. The operation is enabled to be performed based on the information about the selected member. The operation may include addressing the selected member, enabling a communication between the user and the selected member, or the like.

19 Claims, 11 Drawing Sheets

(75) Inventors: Matthew Fukuda, San Francisco, CA (US); E. Stanley Ott, IV, Palo Alto, CA (US); F. Randall Farmer, Palo Alto, CA (US); Edward Ho, San Jose, CA (US); Jonathan James Trevor, Santa Clara, CA (US)

(51) Int. Cl.
*G06Q 10/10* (2012.01)
*H04L 29/08* (2006.01)

(52) U.S. Cl.
CPC ............ *H04L 51/32* (2013.01); *G06Q 10/107* (2013.01); *H04L 67/146* (2013.01)

(58) Field of Classification Search
USPC ............... 715/753; 709/223; 707/6, 999.102; 71/753
See application file for complete search history.

(56) References Cited

U.S. PATENT DOCUMENTS

| | | | |
|---|---|---|---|
| 6,201,814 B1 | 3/2001 | Greenspan | |
| 6,208,339 B1 | 3/2001 | Atlas et al. | |
| 6,247,043 B1 | 6/2001 | Bates et al. | |
| 6,269,369 B1 | 7/2001 | Robertson | |
| 6,377,965 B1 | 4/2002 | Hachamovitch et al. | |
| 6,421,672 B1 | 7/2002 | McAllister et al. | |
| 6,549,768 B1* | 4/2003 | Fraccaroli | 455/456.3 |
| 6,557,004 B1 | 4/2003 | Ben-Shachar et al. | |
| 6,775,689 B1 | 8/2004 | Raghunandan | |
| 6,829,607 B1 | 12/2004 | Tafoya et al. | |
| 6,832,245 B1 | 12/2004 | Isaacs et al. | |
| 6,901,436 B1 | 5/2005 | Schneider | |
| 6,952,805 B1 | 10/2005 | Tafoya et al. | |
| 6,968,179 B1* | 11/2005 | De Vries | 455/414.1 |
| 6,996,413 B2 | 2/2006 | Inselberg | |
| 7,010,572 B1 | 3/2006 | Benjamin et al. | |
| 7,047,030 B2 | 5/2006 | Forsyth | |
| 7,103,379 B2 | 9/2006 | Hilerio | |
| 7,111,044 B2 | 9/2006 | Lee | |
| 7,149,780 B2 | 12/2006 | Quine et al. | |
| 7,162,474 B1 | 1/2007 | Harker et al. | |
| 7,184,790 B2 | 2/2007 | Dorenbosch et al. | |
| 7,240,298 B2 | 7/2007 | Grossman et al. | |
| 7,248,888 B2 | 7/2007 | Inselberg | |
| 7,249,123 B2 | 7/2007 | Elder et al. | |
| 7,313,760 B2 | 12/2007 | Grossman et al. | |
| 7,319,882 B2 | 1/2008 | Mendiola et al. | |
| 7,360,174 B2 | 4/2008 | Grossman et al. | |
| 7,366,759 B2 | 4/2008 | Trevithick et al. | |
| 7,418,663 B2 | 8/2008 | Pettinati et al. | |
| 7,430,719 B2 | 9/2008 | Pettinati et al. | |
| 7,444,351 B1 | 10/2008 | Nomiyama | |
| 7,472,110 B2 | 12/2008 | Achlioptas | |
| 7,512,654 B2 | 3/2009 | Tafoya et al. | |
| 7,516,411 B2 | 4/2009 | Beaton et al. | |
| 7,543,026 B2 | 6/2009 | Quine et al. | |
| 7,543,243 B2 | 6/2009 | Schwartz et al. | |
| 7,577,665 B2 | 8/2009 | Ramer et al. | |
| 7,580,363 B2 | 8/2009 | Sorvari et al. | |
| 7,596,555 B2 | 9/2009 | Klein | |
| 7,596,597 B2* | 9/2009 | Liu | H04L 67/306 709/204 |
| 7,620,387 B2 | 11/2009 | Rybak | |
| 7,631,266 B2 | 12/2009 | Werndorfer et al. | |
| 7,634,741 B2 | 12/2009 | Klein | |
| 7,636,719 B2 | 12/2009 | Thompson et al. | |
| 7,639,634 B2 | 12/2009 | Shaffer et al. | |
| 7,680,770 B1 | 3/2010 | Buyukkokten et al. | |
| 7,684,815 B2 | 3/2010 | Counts et al. | |
| 7,725,523 B2 | 5/2010 | Bolnick et al. | |
| 7,865,206 B2 | 1/2011 | Quoc et al. | |
| 7,873,639 B2 | 1/2011 | Shipman | |
| 8,006,190 B2 | 8/2011 | Quoc et al. | |
| 8,171,424 B1* | 5/2012 | Karam | 715/810 |
| 8,200,763 B2 | 6/2012 | Quoc et al. | |
| 2001/0031632 A1 | 10/2001 | Benz et al. | |
| 2002/0023230 A1 | 2/2002 | Bolnick et al. | |
| 2002/0073163 A1 | 6/2002 | Churchill et al. | |
| 2002/0091773 A1 | 7/2002 | Chowdhry et al. | |
| 2002/0128001 A1 | 9/2002 | Shuttleworth | |
| 2003/0036914 A1* | 2/2003 | Fitzpatrick | G06Q 30/02 705/319 |
| 2003/0045272 A1* | 3/2003 | Burr | H04L 63/101 455/411 |
| 2003/0105827 A1* | 6/2003 | Tan | G06Q 10/107 709/206 |
| 2003/0153341 A1 | 8/2003 | Crockett et al. | |
| 2003/0212680 A1 | 11/2003 | Bates et al. | |
| 2004/0001446 A1 | 1/2004 | Bhatia et al. | |
| 2004/0034591 A1 | 2/2004 | Waelbroeck et al. | |
| 2004/0034723 A1 | 2/2004 | Giroti | |
| 2004/0044536 A1* | 3/2004 | Fitzpatrick | G06Q 10/107 709/206 |
| 2004/0119760 A1 | 6/2004 | Grossman et al. | |
| 2004/0135816 A1 | 7/2004 | Schwartz et al. | |
| 2004/0137882 A1 | 7/2004 | Forsyth | |
| 2004/0167966 A1 | 8/2004 | Lee et al. | |
| 2004/0199580 A1 | 10/2004 | Zhakov et al. | |
| 2004/0210844 A1 | 10/2004 | Pettinati et al. | |
| 2004/0215793 A1* | 10/2004 | Ryan | G06Q 50/01 709/229 |
| 2004/0219936 A1 | 11/2004 | Kontiainen | |
| 2005/0021624 A1 | 1/2005 | Herf et al. | |
| 2005/0034079 A1 | 2/2005 | Gunasekar et al. | |
| 2005/0038876 A1 | 2/2005 | Chaudhuri | |
| 2005/0076013 A1 | 4/2005 | Hilbert et al. | |
| 2005/0081059 A1 | 4/2005 | Bandini et al. | |
| 2005/0143106 A1 | 6/2005 | Chan et al. | |
| 2005/0164725 A1 | 7/2005 | Naito et al. | |
| 2005/0174975 A1 | 8/2005 | Mgrdechian et al. | |
| 2005/0177385 A1 | 8/2005 | Hull et al. | |
| 2005/0209914 A1 | 9/2005 | Nguyen et al. | |
| 2005/0209999 A1* | 9/2005 | Jou | G06Q 10/00 |
| 2005/0212659 A1 | 9/2005 | Sauer | |
| 2005/0216848 A1 | 9/2005 | Thompson et al. | |
| 2005/0250552 A1* | 11/2005 | Eagle et al. | 455/567 |
| 2005/0267940 A1 | 12/2005 | Galbreath et al. | |
| 2006/0010104 A1 | 1/2006 | Pettinati et al. | |
| 2006/0026535 A1 | 2/2006 | Hotelling et al. | |
| 2006/0059123 A1 | 3/2006 | Klein | |
| 2006/0067250 A1 | 3/2006 | Boyer et al. | |
| 2006/0068818 A1 | 3/2006 | Leitersdorf et al. | |
| 2006/0111135 A1 | 5/2006 | Gray et al. | |
| 2006/0123082 A1 | 6/2006 | Digate et al. | |
| 2006/0195531 A1 | 8/2006 | Braun et al. | |
| 2006/0240856 A1 | 10/2006 | Counts et al. | |
| 2006/0242234 A1 | 10/2006 | Counts et al. | |
| 2006/0250975 A1 | 11/2006 | Grech et al. | |
| 2006/0270419 A1 | 11/2006 | Crowley et al. | |
| 2007/0022003 A1 | 1/2007 | Chao et al. | |
| 2007/0032267 A1 | 2/2007 | Haitani et al. | |
| 2007/0047697 A1 | 3/2007 | Drewry et al. | |
| 2007/0049344 A1 | 3/2007 | Van Der Velde et al. | |
| 2007/0060328 A1* | 3/2007 | Zrike et al. | 463/29 |
| 2007/0067285 A1 | 3/2007 | Blume et al. | |
| 2007/0073663 A1 | 3/2007 | McVeigh et al. | |
| 2007/0094327 A1* | 4/2007 | Ito et al. | 709/204 |
| 2007/0152978 A1 | 7/2007 | Kocienda et al. | |
| 2007/0197247 A1 | 8/2007 | Inselberg | |
| 2007/0208747 A1* | 9/2007 | Puckrin | G06Q 50/01 |
| 2007/0214141 A1* | 9/2007 | Sittig et al. | 707/7 |
| 2007/0233656 A1 | 10/2007 | Bunescu et al. | |
| 2007/0233681 A1 | 10/2007 | Ronen et al. | |
| 2007/0255807 A1 | 11/2007 | Hayashi et al. | |
| 2007/0264980 A1 | 11/2007 | Richardson et al. | |
| 2007/0276846 A1 | 11/2007 | Ramanathan et al. | |
| 2008/0045236 A1 | 2/2008 | Nahon et al. | |
| 2008/0071867 A1 | 3/2008 | Pearson et al. | |
| 2008/0098087 A1* | 4/2008 | Lubeck | 709/218 |
| 2008/0120410 A1 | 5/2008 | Quoc et al. | |
| 2008/0186926 A1 | 8/2008 | Baio et al. | |

(56) References Cited

U.S. PATENT DOCUMENTS

2008/0208812 A1  8/2008  Quoc et al.
2008/0280637 A1  11/2008  Shaffer et al.
2011/0072125 A1  3/2011  Quoc et al.

FOREIGN PATENT DOCUMENTS

KR   10-0564310 B1   3/2006
WO   2004095806 A2   11/2004
WO   2005114970 A2   12/2005

OTHER PUBLICATIONS

Chuah, Mei; "Reality Instant Messaging: Injecting a Dose of Reality into Online Chat;" CHI 2003; pp. 926-927; Apr. 5-10, 2003; ACM 1-58113-637-4/03/0004.*
Coppens, Toon, Lievan Trappeniers, and Marc Godon; "AmigoTV: towards a social TV experience;" Proceedings from the Second European Conference on Interactive Television "Enhancing the experience", University of Brighton, vol. 36; 2004.*
Pousman, Zachary, Giovanni Iachello, Rachel Fithian, Jehan Moghazy, and John Stasko; "Design iterations for a location-aware event planner;" Journal of Personal and Ubiquitous Computing, vol. 8, Issue 2; May 1, 2004.*
Metz, Cade; "Make Contact;" PC Magazine; Jan. 20, 2004; pp. 131-138.*
Allardice, Linda C.; "Finding Classmates Online;" Link Up; Jun. 2001; p. 20.*
Official Communication for Chinese Patent Application No. 200780048985.3 mailed Dec. 26, 2011.
Official Communication for Taiwanese Patent Application No. 97100810 issued Sep. 6, 2011.
Federated search, http://en.wikipedia.org/w/index.php?title=Federated_search&oldid=126455262, last visited May 15, 2007.
Crowley, D. P. et al., U.S. Appl. No. 60/570,410, filed May 12, 2004, "Location-Based Social Software for Mobile Decives," 18 pages.
Event Definition from the Merriam-Webster Online Dictionary accessed Jan. 2, 2010, 2 pages, http://m-w.com/dictionary/event.
Event from The American Heritage Dictionary of the English Language, CREDO reference, accessed Jan. 2, 2010, 2 pages, http://www.credoreference.com/entry/hmdictenglang/event.
Häkkilä, J. et al., "User Experiences on Combining Location Sensitive Mobile Phone Applications and Multimedia Messaging," In Proceedings of the 3rd International Conference on Mobile and Ubiquitous Multimedia, College Park, Maryland, Oct. 27-29, 2004, MUM 2004, vol. 83 ACM, New York, NY, pp. 179-185.
"Friendster For Your Mobile Phone," Trandcentral, Apr. 19, 2004, 1 page.
"Circle Line: Let your Cell Phone Keep Tabs on Your Friends," Dodgeball.com—Originally published in Time Out NY, No. 247, Dec. 4-11, 2003, pp. 174-175.
"So Happy Together," Dodgeball.com—Originally published in Newsweek, May 10, 2004, pp. 12-13.
"Dodgeball Goes Multi-City," CORANTE: Tech News. Filtered Daily.; Many2Many: A Group Weblog on Social Software, Apr. 17, 2004, 1 page.
International Search Report and Written Opinion for International Application No. PCT/US2008/050234 mailed Apr. 23, 2008.
International Preliminary Report on Patentability for International Patent Application No. PCT/US2008/050234 mailed Aug. 13, 2009.
Official Communication for U.S. Appl. No. 11/670,400 mailed Aug. 11, 2009.
Official Communication for U.S. Appl. No. 11/670,400 mailed Feb. 4, 2010.
Official Communication for U.S. Appl. No. 11/670,400 mailed Oct. 25, 2010.
Official Communication for U.S. Appl. No. 11/670,400 mailed Apr. 28, 2011.
Official Communication for U.S. Appl. No. 11/562,827 mailed Jun. 17, 2009.
Official Communication for U.S. Appl. No. 11/562,827 mailed Jan. 6, 2010.
Official Communication for U.S. Appl. No. 11/562,827 mailed Jul. 20, 2010.
Official Communication for U.S. Appl. No. 11/562,827 mailed Feb. 1, 2011.
Official Communication for U.S. Appl. No. 11/562,827 mailed Dec. 8, 2011.
Official Communication for U.S. Appl. No. 11/562,827 mailed Feb. 16, 2012.
Official Communication for U.S. Appl. No. 11/688,749 mailed Aug. 27, 2009.
Official Communication for U.S. Appl. No. 11/688,749 mailed May 18, 2010.
Official Communication for U.S. Appl. No. 11/688,749 mailed Jul. 13, 2010.
Official Communication for U.S. Appl. No. 11/688,749 mailed Aug. 30, 2010.
Official Communication for U.S. Appl. No. 12/955,771 mailed Jul. 21, 2011.
Official Communication for U.S. Appl. No. 11/712,855 mailed May 12, 2009.
Official Communication for U.S. Appl. No. 11/712,855 mailed Nov. 18, 2009.
Official Communication for U.S. Appl. No. 11/712,855 mailed Feb. 2, 2010.
Official Communication for U.S. Appl. No. 11/712,855 mailed Mar. 23, 2010.
Official Communication for U.S. Appl. No. 11/712,855 mailed Aug. 30, 2010.
Official Communication for U.S. Appl. No. 11/712,855 mailed Nov. 9, 2010.
Official Communication for U.S. Appl. No. 11/712,855 mailed Jan. 24, 2012.
Official Communication for U.S. Appl. No. 11/712,855 mailed Jul. 26, 2012.
Diehl, C. P. et al., "Name Reference Resolution in Organizational Email Archives," Proceedings of the Sixth SIAM International Conference on Data Mining, Apr. 20-22, 2006, Bethesda, MD.
Malin, B. et al., "A Network Analysis Model for Disambiguation of Names in Lists," Computational & Mathematical Organization Theory, vol. 11, No. 2, Jul. 2005, pp. 119-139.
Yang, K.-H. et al., "Web Appearance Disambiguation of Personal Names Based on Network Motif," Proceedings of the 2006 IEEE/WIC/ACM International Conference on Web Intelligence, Dec. 18-22, 2006, pp. 386-389.
"Yahoo! Users can Now Search and Send Email with Four11 Directory," PR Newswire, Apr. 10, 1996, p. 410SFW007.
Bekkerman, R. et al., "Disambiguating Web Appearances of People in a Social network," Proceedings of the 14th International Conference on World Wide Web, May 10-14, 2005, Chiba, Japan.
Culotta, A. et al., "Extracting Social Networks and Contact Information from Email and the Web," Department of Computer Science, University of Massachusetts, Amherst, MA, 2004 http://www2.selu.edu/Academics/Faculty/aculotta/pubs/culotta04extracting.pdf.
Holzer, R. et al., "Email Alias Detection Using Social Network Analysis," Proceedings of the 3rd International Workshop on Link Discovery, Aug. 21-25, 2005, Chicago, Illinois, pp. 52-57.
Bollegala, D. et al., "Extracting Key Phrases to Disambiguate Personal Names on the Web," Proceedings of the CICLing 2006, Mexico City, Mexico.
"Disambiguation of Intended E-mail Recipients by Contextual analysis of E-mail Subject and Body Text," IBM Technical Disclosure Bulletin, UK, No. 450, Oct. 2001, p. 1749, TDB-ACC-No. NNRD450111.
"Ambiguity Memory," IBM Technical Disclosure Bulletin, US, vol. 36, No. 8, Aug. 1993, pp. 229-230, TDB-ACC-No. NN9308229.
Official Communication and Search Report for European Patent Application Serial No. 07798558.8.-2201 mailed Nov. 18, 2010.
Official Communication for Chinese Patent Application Serial No. 2007-80048985.3 mailed Aug. 25, 2010.

(56) References Cited

OTHER PUBLICATIONS

Official Communication for Korean Patent Application Serial No.10-2009-7011142 mailed Jan. 13, 2011.
International Search Report for International Patent Application No. PCT/US2007/071204 dated Dec. 7, 2007.
Written Opinion for International Patent Application No. PCT/US2007/071204 dated Dec. 7, 2007.
Office Communication for U.S. Appl. No. 11/555,247 mailed Jun. 7, 2010.
Office Communication for U.S. Appl. No. 11/555,247 mailed Oct. 28, 2010.
Office Communication for U.S. Appl. No. 11/555,247 mailed Jan. 4, 2011.
Office Communication for U.S. Appl. No. 11/555,247 mailed Apr. 12, 2011.

* cited by examiner

SOCIAL NAMESPACE ADDRESSING FOR NON-UNIQUE IDENTIFIERS

CROSS-REFERENCE TO RELATED APPLICATION

This utility patent application is a Continuation of allowed U.S. patent application Ser. No. 11/555,247 filed on Oct. 31, 2006, the benefits of which are claimed under 35 U.S.C. §120, and further incorporated herein by reference.

FIELD OF THE INVENTION

The present invention relates generally to mobile communications and, more particularly, but not exclusively to enabling a communication based on a non-unique identifier associated with a user within a social network.

BACKGROUND OF THE INVENTION

Tremendous changes have been occurring in the Internet that influence our everyday lives. For example, online social networks have become the new meeting grounds. They have been called the new power lunch tables and new golf courses for business life in the U.S. Moreover, many people are using such online social networks to reconnect themselves to their friends, their neighborhood, their community, and to otherwise stay in touch.

The development of such online social networks touch countless aspects of our everyday lives, providing instant access to people of similar mindsets, and enabling us to form partnerships with more people in more ways than ever before.

One aspect of our everyday lives that may benefit from online social networking technology involves the aspect that social gatherings may often occur in a less than organized, impromptu fashion. For example, people may decide, online to get together at some restaurant, club, or the like, almost immediately. Users may meet each other at such social gatherings and may further wish to interact with each other. However, a user may not know or remember how to contact the other person. Thus, it is with respect to these considerations and others that the present invention has been made.

BRIEF DESCRIPTION OF THE DRAWINGS

Non-limiting and non-exhaustive embodiments of the present invention are described with reference to the following drawings. In the drawings, like reference numerals refer to like parts throughout the various figures unless otherwise specified.

For a better understanding of the present invention, reference will be made to the following Detailed Description, which is to be read in association with the accompanying drawings, wherein.

DETAILED DESCRIPTION OF THE INVENTION

Figure 1:
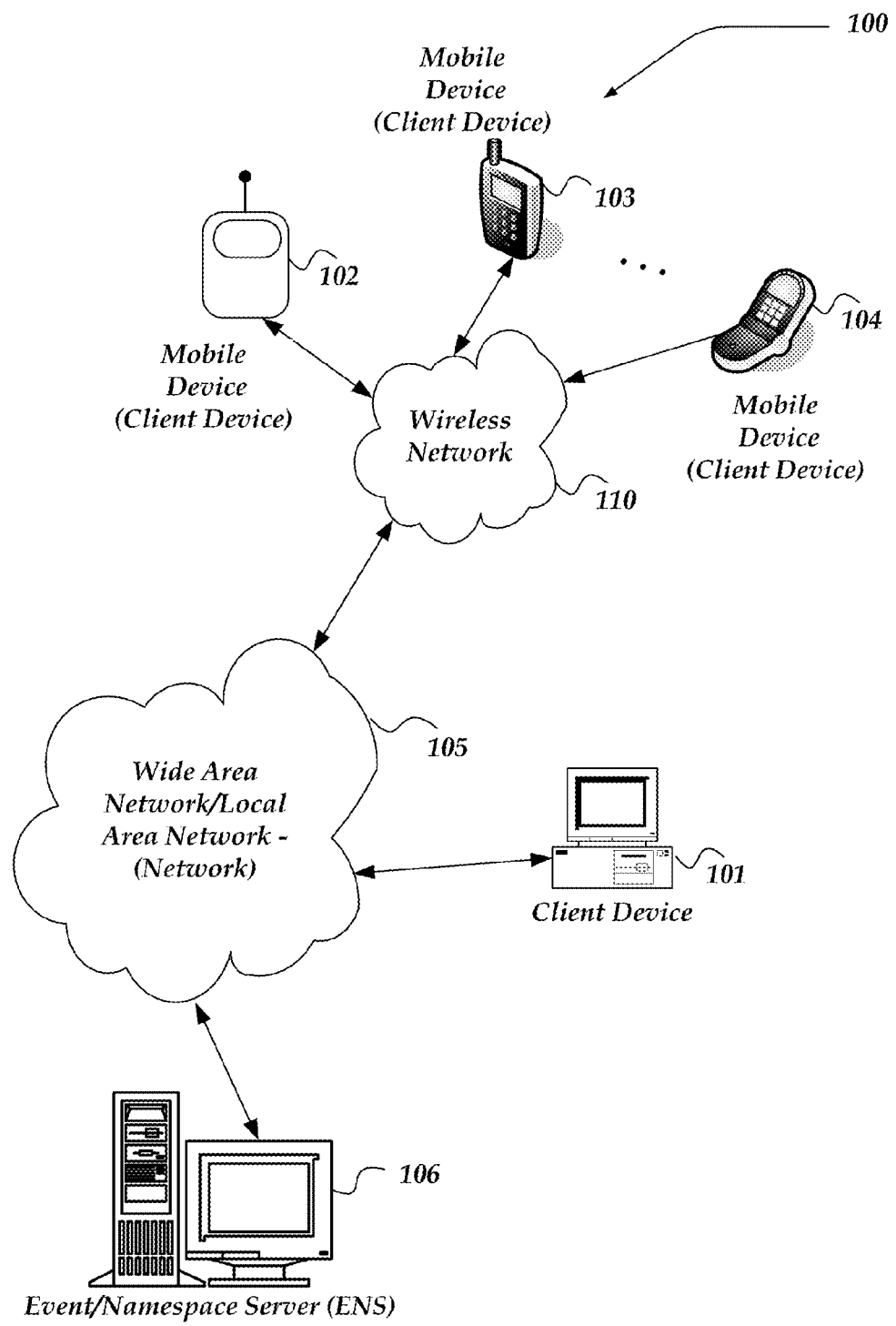
FIG. 1 is a system diagram of one embodiment of an environment in which the invention may be practiced.

The present invention now will be described more fully hereinafter with reference to the accompanying drawings, which form a part hereof, and which show, by way of illustration, specific embodiments by which the invention may be practiced. This invention may, however, be embodied in many different forms and should not be construed as limited to the embodiments set forth herein; rather, these embodiments are provided so that this disclosure will be thorough and complete, and will fully convey the scope of the invention to those skilled in the art. Among other things, the present invention may be embodied as methods or devices. Accordingly, the present invention may take the form of an entirely hardware embodiment, an entirely software embodiment or an embodiment combining software and hardware aspects. The following detailed description is, therefore, not to be taken in a limiting sense.

Throughout the specification and claims, the following terms take the meanings explicitly associated herein, unless the context clearly dictates otherwise. The phrase "in one embodiment" as used herein does not necessarily refer to the same embodiment, though it may. Furthermore, the phrase "in another embodiment" as used herein does not necessarily refer to a different embodiment, although it may. Thus, as described below, various embodiments of the invention may be readily combined, without departing from the scope or spirit of the invention.

In addition, as used herein, the term "or" is an inclusive "or" operator, and is equivalent to the term "and/or," unless the context clearly dictates otherwise. The term "based on" is not exclusive and allows for being based on additional factors not described, unless the context clearly dictates otherwise. In addition, throughout the specification, the meaning of "a," "an," and "the" include plural references. The meaning of "in" includes "in" and "on."

As used herein, the terms "social network" and "social community" refer to a concept that an individual's personal network of friends, family colleagues, coworkers, and the subsequent connections within those networks, can be utilized to find more relevant connections for a variety of activities, including, but not limited to dating, job networking, service referrals, content sharing, like-minded individuals, activity partners, or the like. Such social network may be created based on a variety of criteria, including, for example, a social event, such as a party, meeting event, or the like.

As used herein, the term "event" refers to any social gathering of people, having a start time and an end time. In one embodiment, the start, and/or end times may be loosely established, in that they may occur informally, such as might arise based on an informal gathering of people. In another embodiment, the event may have established start and/or end times. Moreover, in one embodiment, the event may have multiple start/end times, such as might occur with a regularly scheduled meeting, or the like.

As used herein, the term "media content" refers to any digital data directed towards a user of a computing device, including, but not limited to audio data, multimedia data, photographs, video data, still images, text, graphics, animation files, voice messages, text messages, or the like.

As used herein, the terms "ID" or "user ID" refers to an identifier for a user. The identifier may include any text or multimedia content useable in identifying a user, including an alphanumeric string, picture, sound, movie clip, or the like. The term "namespace ID (NID)" refers to a user identifier (ID) that may be non-unique. That is, an NID may be associated with more than one user. For example, "John" may represent an NID that may be associated with a plurality of users.

As used herein, the term "member" refers to a user who is included in a grouping, such as a social network, a group, or the like. As used herein, the term "member distinction" refers to information used to distinguish members in a grouping. As used herein, the term "group" refers to a grouping of members. A group may be unassociated or associated with an event (including a permanent, recurring or temporary event).

As used herein, the term "addressing" refers to any form of contact with a member, including communicating with a member, sending a group message (e.g. message board, server list), wherein the member may be at least one of recipient of the group message, sending a message directly to the member (e.g. via SMS, IM, email), or otherwise providing information to the member, or the like.

Briefly stated the present invention is directed towards enabling a user to disambiguate an identity of a member included in a user's social network (USN), and towards enabling an operation to be performed based on information about the member.

The USN is determined. In one embodiment, the USN is determined based on a relationship of the members in a group associated with an event. In one embodiment, the event includes the user.

The NID of the member is received. If the NID is non-unique within the USN, member distinctions are determined for a plurality of members in the USN who are associated with the NID. In one embodiment, the member distinctions are determined based in part on event characteristics. The member distinctions may include a time of last contact, an amount of communication, a common friend, identification information of a particular member, a characteristic of a previous event including the user and a particular member, or the like.

The member distinctions are sent to the user. The user makes a selection of one of the members associated with one of the member distinctions. Based on the selection, information about the selected member is received by a server. The operation is enabled to be performed based on the information about the member from the selection. The operation may include addressing the selected member, enabling a communication between the user and the selected member, or the like.

Illustrative Operating Environment

FIG. 1 shows components of one embodiment of an environment in which the invention may be practiced. Not all the components may be required to practice the invention, and variations in the arrangement and type of the components may be made without departing from the spirit or scope of the invention. As shown, system 100 of FIG. 1 includes local area networks ("LANs")/wide area networks ("WANs")—(network) 105, wireless network 110, Event/Namespace Server (ENS) 106, mobile devices (client devices) 102-104, and client device 101.

One embodiment of mobile devices 102-104 is described in more detail below in conjunction with FIG. 2. Generally, however, mobile devices 102-104 may include virtually any portable computing device capable of receiving and sending a message over a network, such as network 105, wireless network 110, or the like. Mobile devices 102-104 may also be described generally as client devices that are configured to be portable. Thus, mobile devices 102-104 may include virtually any portable computing device capable of connecting to another computing device and receiving information. Such devices include portable devices such as, cellular telephones, smart phones, display pagers, radio frequency (RF) devices, infrared (IR) devices, Personal Digital Assistants (PDAs), handheld computers, laptop computers, wearable computers, tablet computers, integrated devices combining one or more of the preceding devices, and the like. As such, mobile devices 102-104 typically range widely in terms of capabilities and features. For example, a cell phone may have a numeric keypad and a few lines of monochrome LCD display on which only text may be displayed. In another example, a web-enabled mobile device may have a touch sensitive screen, a stylus, and several lines of color LCD display in which both text and graphics may be displayed.

A web-enabled mobile device may include a browser application that is configured to receive and to send web pages, web-based messages, and the like. The browser application may be configured to receive and display graphics, text, multimedia, and the like, employing virtually any web based language, including a wireless application protocol messages (WAP), and the like. In one embodiment, the browser application is enabled to employ Handheld Device Markup Language (HDML), Wireless Markup Language (WML), WMLScript, JavaScript, Standard Generalized Markup Language (SMGL), HyperText Markup Language (HTML), eXtensible Markup Language (XML), and the like, to display and send a message.

Mobile devices 102-104 also may include at least one other client application that is configured to receive content from another computing device. The client application may include a capability to provide and receive textual content, media content, and the like. The client application may further provide information that identifies itself, including a type, capability, name, and the like. In one embodiment, mobile devices 102-104 may uniquely identify themselves through any of a variety of mechanisms, including a phone number, Mobile Identification Number (MIN), an electronic serial number (ESN), or other mobile device identifier. The information may also indicate a content format that the mobile device is enabled to employ. Such information may be provided in a message, or the like, sent to ENS 106, client device 101, or other computing devices.

Mobile devices 102-104 may also be configured to communicate a message, such as through Short Message Service (SMS), Multimedia Message Service (MMS), instant messaging (IM), internet relay chat (IRC), Mardam-Bey's IRC (mIRC), Jabber, and the like, between another computing device, such as ENS 106, client device 101, each other, or the like. However, the present invention is not limited to these message protocols, and virtually any other message protocol may be employed. For example, the client application may enable a user to interact with the browser application, email application, VOIP applications, or the like.

Mobile devices 102-104 may further be configured to include a client application that enables the end-user to log into an end-user account that may be managed by another computing device, such as ENS 106. Such end-user account, for example, may be configured to enable the end-user to receive emails, send/receive IM messages, SMS messages, access selected web pages, participate in a social networking event, or the like. However, participation in various social networking events may also be performed without logging into the end-user account.

In addition, mobile devices 102-104 may include another application that is configured to enable the mobile user to share and/or receive media content, and to display the media content. In one embodiment, each of mobile devices 102-104 may share with and/or receive the media content from ENS 106 and/or from another one of mobile devices 102-104. For example, media content may be shared between the mobile devices using MMS, WAP, or the like. In one embodiment, a mobile device may receive a message indicating the media content is available for viewing and/or annotating at a website, or the like.

In conjunction with sharing media content, mobile devices 102-104 may enable an interaction with each other, through sharing various messages, and generally participating in a variety of integrated social experiences beyond merely voice communications. In one embodiment, mobile devices 102-104 may enable the interaction with a user associated with an event. For example, a user of one of mobile devices 102-104 may create a group that includes identified members, and send a message to the members regarding the event. In one embodiment, members of the group may then elect to share media content, such as photographs, video clips, audio clips, text messages, emails, or the like, with other members of the group. Moreover, mobile devices 102-104 may enable any of the members of the group to also add other members to the group.

Figure 6:
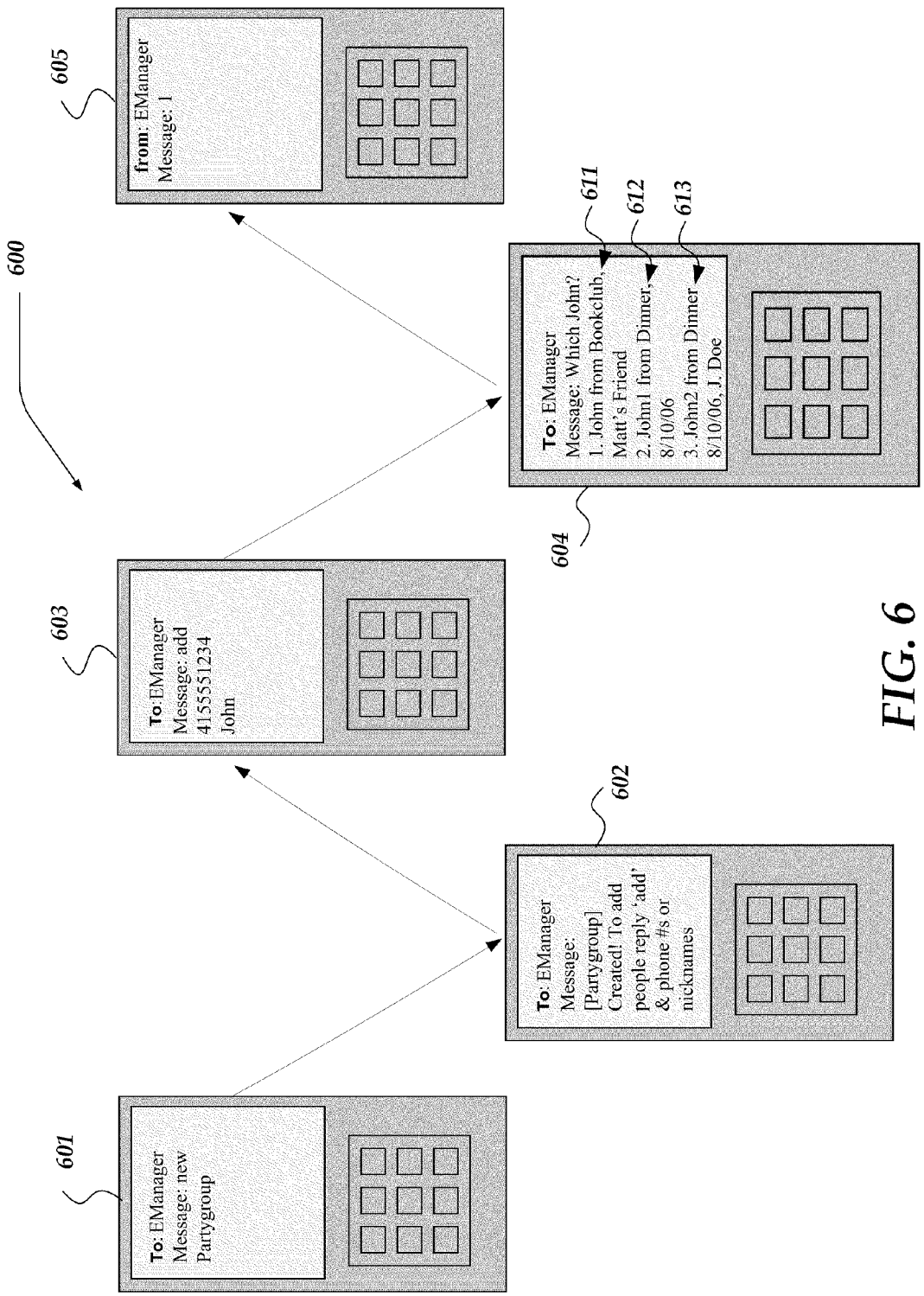
FIG. 6 shows one embodiment of a use case illustrating enabling an operation to be performed on, with, or to a member of a social network associated with a namespace ID.
Figure 7:
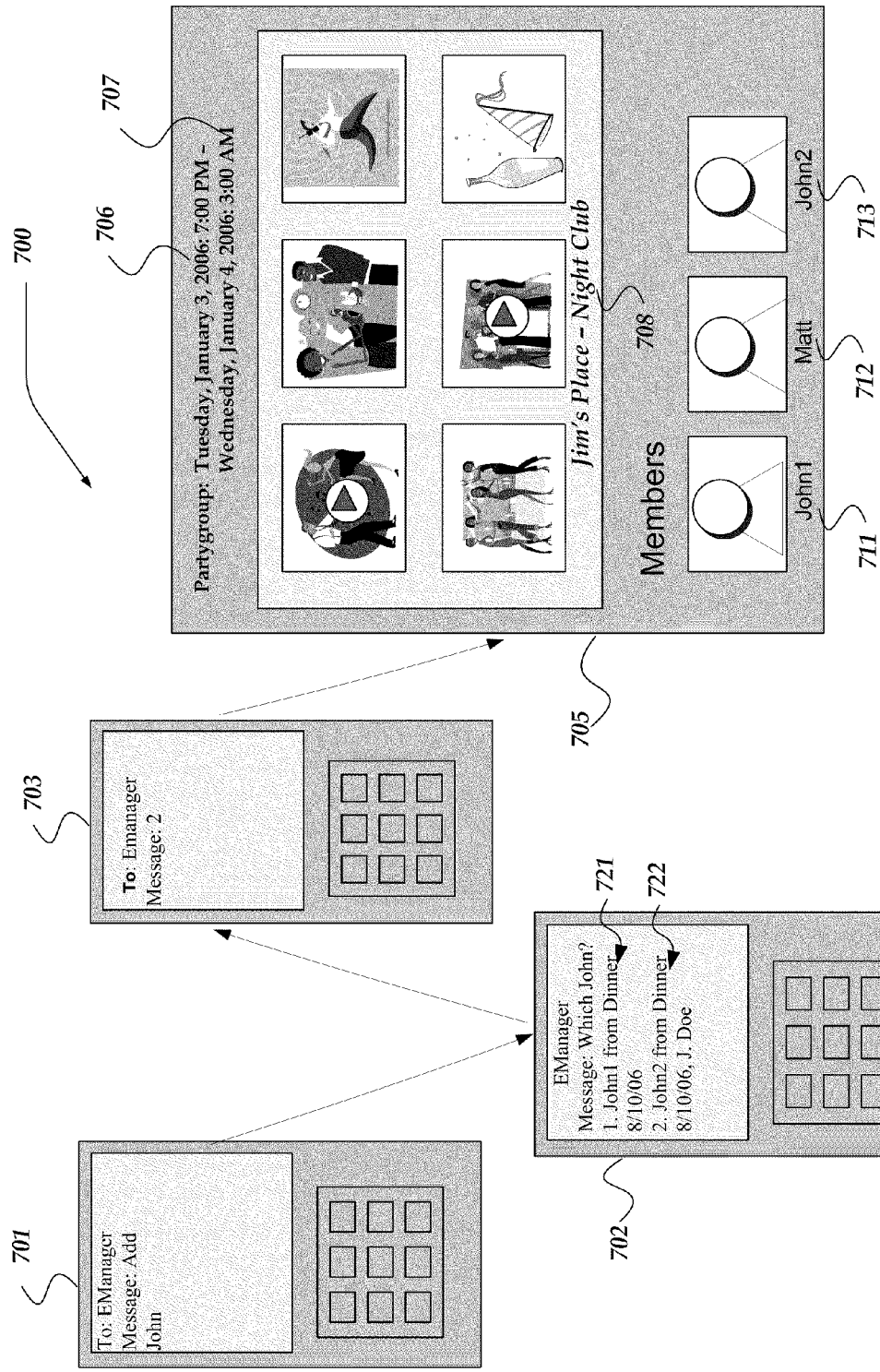
FIG. 7 shows one embodiment of another use case illustrating enabling an operation to be performed on, with, or to a member of a social network associated with a namespace ID.

A user's social network may be determined based on the user's creation and/or membership in the group and other users' membership in the group. In one embodiment, the user may further interact with a member of the user's social network who is associated with a namespace ID. FIGS. 6-7 below include one embodiment of examples of a group creation, and enabling an interaction between the user and a member associated with a namespace ID. In one embodiment, the interaction may be an SMS, email, or IM communication between one of mobile devices 102-104 and another device over network 110 and network 105.

Mobile devices 102-104 may also communicate with non-mobile client devices, such as client device 101, or the like. In one embodiment, such communications may include providing information about the shared media to a user of client device 101, or the like.

Client device 101 may include virtually any computing device capable of communicating over a network to send and receive information, including social networking information, or the like. One embodiment of client device 101 is described in more detail below in conjunction with FIG. 2. Generally however, the set of such devices may include devices that typically connect using a wired or wireless communications medium such as personal computers, multiprocessor systems, microprocessor-based or programmable consumer electronics, network PCs, or the like. In one embodiment, client device 101 may be configured to access a website, or other location, of shared media content, and to annotate the media content, add additional media content, or the like. Similar to mobile devices 102-104, client device 101 may be configured to allow a user to interact with a member of the user's social network by using a namespace ID.

Wireless network 110 is configured to couple mobile devices 102-104 and its components with network 105. Wireless network 110 may include any of a variety of wireless sub-networks that may further overlay stand-alone ad-hoc networks, and the like, to provide an infrastructure-oriented connection for mobile devices 102-104. Such sub-networks may include mesh networks, Wireless LAN (WLAN) networks, cellular networks, and the like.

Wireless network 110 may further include an autonomous system of terminals, gateways, routers, and the like connected by wireless radio links, and the like. These connectors may be configured to move freely and randomly and organize themselves arbitrarily, such that the topology of wireless network 110 may change rapidly.

Wireless network 110 may further employ a plurality of access technologies including 2nd (2G), 3rd (3G) generation radio access for cellular systems, WLAN, Wireless Router (WR) mesh, and the like. Access technologies such as 2G, 3G, and future access networks may enable wide area coverage for mobile devices, such as mobile devices 102-104 with various degrees of mobility. For example, wireless network 110 may enable a radio connection through a radio network access such as Global System for Mobile communication (GSM), General Packet Radio Services (GPRS), Enhanced Data GSM Environment (EDGE), Wideband Code Division Multiple Access (WCDMA), and the like. In essence, wireless network 110 may include virtually any wireless communication mechanism by which information may travel between mobile device s 102-104 and another computing device, network, and the like.

Network 105 is configured to couple ENS 106 and its components with other computing devices, including, mobile devices 102-104, client device 101, and through wireless network 110 to mobile devices 102-104. Network 105 is enabled to employ any form of computer readable media for communicating information from one electronic device to another. Also, network 105 can include the Internet in addition to local area networks (LANs), wide area networks (WANs), direct connections, such as through a universal serial bus (USB) port, other forms of computer-readable media, or any combination thereof. On an interconnected set of LANs, including those based on differing architectures and protocols, a router acts as a link between LANs, enabling messages to be sent from one to another. Also, communication links within LANs typically include twisted wire pair or coaxial cable, while communication links between networks may utilize analog telephone lines, full or fractional dedicated digital lines including T1, T2, T3, and T4, Integrated Services Digital Networks (ISDNs), Digital Subscriber Lines (DSLs), wireless links including satellite links, or other communications links known to those skilled in the art. Furthermore, remote computers and other related electronic devices could be remotely connected to either LANs or WANs via a modem and temporary telephone link. In essence, network 105 includes any communication method by which information may travel between ENS 106, client device 101, and other computing devices.

Additionally, communication media typically embodies computer-readable instructions, data structures, program modules, or other data in a modulated data signal such as a carrier wave, data signal, or other transport mechanism and includes any information delivery media. The terms "modulated data signal," and "carrier-wave signal" includes a signal that has one or more of its characteristics set or changed in such a manner as to encode information, instructions, data, and the like, in the signal. By way of example, communication media includes wired media such as twisted pair, coaxial cable, fiber optics, wave guides, and other wired media and wireless media such as acoustic, RF, infrared, and other wireless media.

One embodiment of ENS 106 is described in more detail below in conjunction with FIG. 3. Briefly, however, ENS 106 may include any computing device capable of connecting to network 105 to enable determination (e.g. creation and/or modification) of a user's social network based on event characteristics.

ENS 106 may be configured to create an event group and to share media content with the members of the group. ENS 106 may receive from various participants in the event, media content, and other social networking information, including information associated with event, messages, or the like. ENS 106 may then employ any of a variety of communication services to enable the messages to be shared between the members of the group. Moreover, ENS 106 may enable a website or other location for storage and access of at least some of the shared messages. ENS 106 further enables members of the group to add more members to the group, even if the member adding is not the original creator of the group.

ENS 106 may also enable a user to interact with a member of the user's social network based on a namespace ID. ENS 106 may be configured to determine a plurality of member distinctions for members with a same namespace ID. In one embodiment, the member distinctions may include characteristics of an event, such as an event's time, location, or the like. The member distinctions enable a user to disambiguating the appropriate member associated with the namespace ID. ENS 106 may communicate this plurality of member distinctions to a device, including one of mobile devices 102-104 and/or client device 101 over network 105 and/or network 110 for a user of the device to enable a selection of list of members associated with the same namespace ID.

Moreover, ENS 106 may enable an interaction between devices used by the user and the disambiguated member, over network 105 and/or network 110. For example, ENS 106 may act as a messaging server to relay messages between the devices. ENS 106 may employ a process similar to that described below in conjunction with FIGS. 4, 5A, and 5B to perform at least some of its actions.

Devices that may operate as ENS 106 include personal computers desktop computers, multiprocessor systems, microprocessor-based or programmable consumer electronics, network PCs, servers, and the like.

Although FIG. 1 illustrates ENS 106 as a single computing device, the invention is not so limited. For example, one or more functions of ENS 106 may be distributed across one or more distinct computing devices. For example, determining member distinctions, managing the mapping of a user/member to a namespace ID, managing various social networking events, including sharing of media content, managing Instant Messaging (IM) session, SMS messages, email messages, posting of media content, determining implicit information such as start/end times, locations, or the like for an event, may be performed by a plurality of computing devices, without departing from the scope or spirit of the present invention.

Illustrative Client Environment

Figure 2:
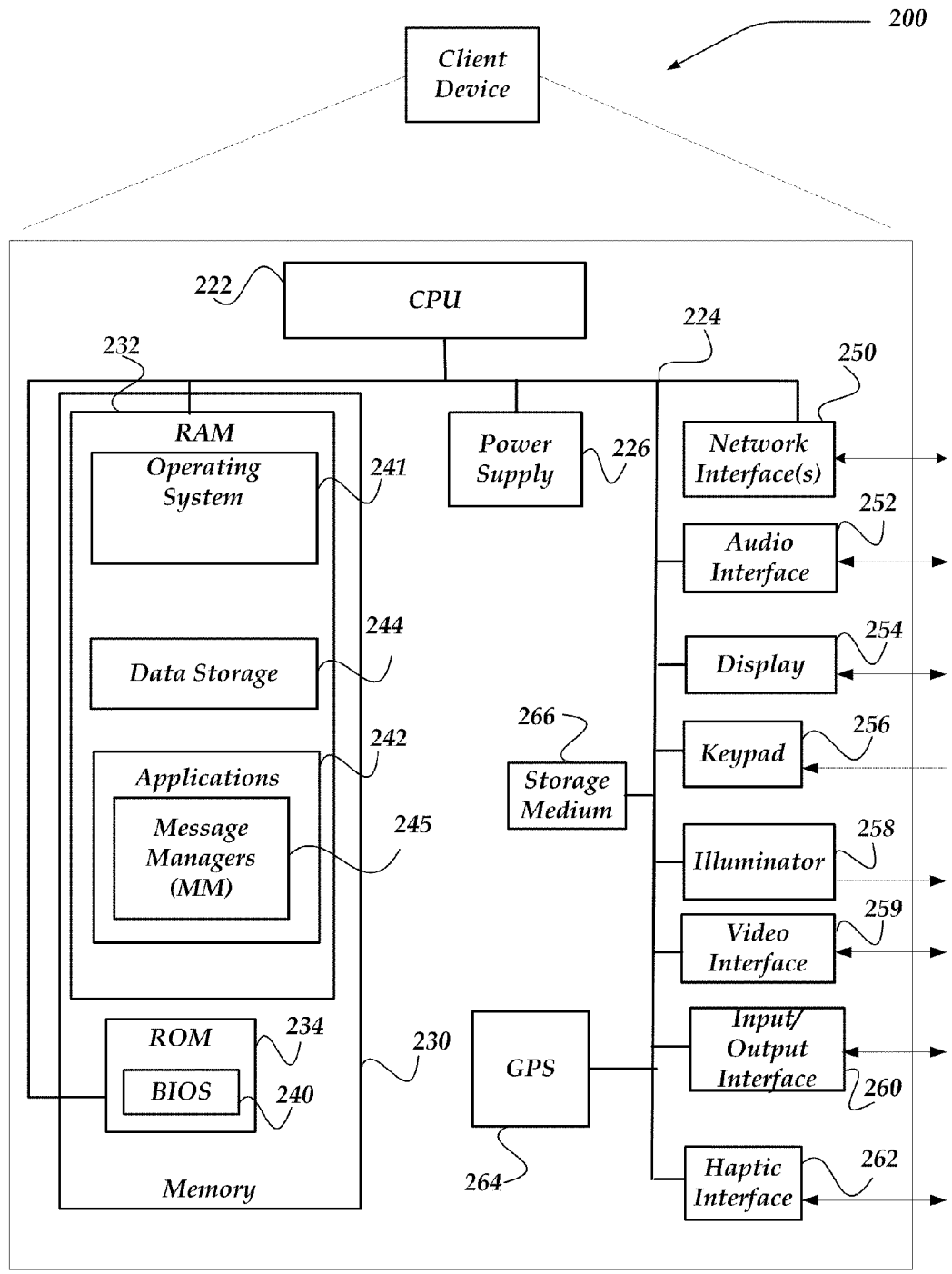
FIG. 2 shows one embodiment of a mobile device that may be included in a system implementing the invention.

FIG. 2 shows one embodiment of client device 200 that may be included in a system implementing the invention. Client device 200 may include many more or less components than those shown in FIG. 2. However, the components shown are sufficient to disclose an illustrative embodiment for practicing the present invention. Client device 200 may represent, for example, mobile devices 102-104 of FIG. 1.

As shown in the figure, client device 200 includes a processing unit (CPU) 222 in communication with a mass memory 230 via a bus 224. Client device 200 also includes a power supply 226, one or more network interfaces 250, an audio interface 252, video interface 259, a display 254, a keypad 256, an illuminator 258, an input/output interface 260, a haptic interface 262, and an optional global positioning systems (GPS) receiver 264. Power supply 226 provides power to mobile device 200. A rechargeable or non-rechargeable battery may be used to provide power. The power may also be provided by an external power source, such as an AC adapter or a powered docking cradle that supplements and/or recharges a battery.

Client device 200 may optionally communicate with a base station (not shown), or directly with another computing device. Network interface 250 includes circuitry for coupling client device 200 to one or more networks, and is constructed for use with one or more communication protocols and technologies including, but not limited to, global system for mobile communication (GSM), code division multiple access (CDMA), time division multiple access (TDMA), user datagram protocol (UDP), transmission control protocol/Internet protocol (TCP/IP), SMS, general packet radio service (GPRS), WAP, ultra wide band (UWB), IEEE 802.16 Worldwide Interoperability for Microwave Access (WiMax), SIP/RTP, or any of a variety of other wireless communication protocols. Network interface 250 is sometimes known as a transceiver, transceiving device, or network interface card (NIC).

Audio interface 252 is arranged to produce and receive audio signals such as the sound of a human voice. For example, audio interface 252 may be coupled to a speaker and microphone (not shown) to enable telecommunication with others and/or generate an audio acknowledgement for some action. Display 254 may be a liquid crystal display (LCD), gas plasma, light emitting diode (LED), or any other type of display used with a computing device. Display 254 may also include a touch sensitive screen arranged to receive input from an object such as a stylus or a digit from a human hand.

Video interface 259 is arranged to capture video images, such as a still photo, a video segment, an infrared video, or the like. For example, video interface 259 may be coupled to a digital video camera, a web-camera, or the like. Video interface 259 may comprise a lens, an image sensor, and other electronics. Image sensors may include a complementary metal-oxide-semiconductor (CMOS) integrated circuit, charge-coupled device (CCD), or any other integrated circuit for sensing light.

Keypad 256 may comprise any input device arranged to receive input from a user. For example, keypad 256 may include a push button numeric dial, or a keyboard. Keypad 256 may also include command buttons that are associated with selecting and sending images. Illuminator 258 may provide a status indication and/or provide light. Illuminator 258 may remain active for specific periods of time or in response to events. For example, when illuminator 258 is active, it may backlight the buttons on keypad 256 and stay on while the client device is powered. Also, illuminator 258 may backlight these buttons in various patterns when particular actions are performed, such as dialing another client device. Illuminator 258 may also cause light sources positioned within a transparent or translucent case of the client device to illuminate in response to actions.

Client device 200 also comprises input/output interface 260 for communicating with external devices, such as a headset, or other input or output devices not shown in FIG. 2. Input/output interface 260 can utilize one or more communication technologies, such as USB, infrared, Bluetooth™, or the like. Haptic interface 262 is arranged to provide tactile feedback to a user of the client device. For example, the haptic interface may be employed to vibrate client device 200 in a particular way when another user of a computing device is calling.

Optional GPS transceiver 264 can determine the physical coordinates of client device 200 on the surface of the Earth, which typically outputs a location as latitude and longitude values. GPS transceiver 264 can also employ other geopositioning mechanisms, including, but not limited to, triangulation, assisted GPS (AGPS), E-OTD, CI, SAI, ETA, BSS or the like, to further determine the physical location of client device 200 on the surface of the Earth. It is understood that under different conditions, GPS transceiver 264 can determine a physical location within millimeters for mobile device 200; and in other cases, the determined physical location may be less precise, such as within a meter or significantly greater distances. In one embodiment, however, mobile device may through other components, provide other information that may be employed to determine a physical location of the device, including for example, a MAC address, IP address, or the like.

Mass memory 230 includes a RAM 232, a ROM 234, and other storage means. Mass memory 230 illustrates another example of computer storage media for storage of information such as computer readable instructions, data structures, program modules or other data. Mass memory 230 stores a basic input/output system ("BIOS") 240 for controlling low-level operation of mobile device 200. The mass memory also stores an operating system 241 for controlling the operation of mobile device 200. It will be appreciated that this component may include a general purpose operating system such as a version of UNIX, or LINUX™, or a specialized client communication operating system such as Windows Mobile™, or the Symbian® operating system. The operating system may include, or interface with a Java virtual machine module that enables control of hardware components and/or operating system operations via Java application programs.

Memory 230 further includes one or more data storage 244, which can be utilized by client device 200 to store, among other things, applications 242 and/or other data. For example, data storage 244 may also be employed to store information that describes various capabilities of mobile device 200. The information may then be provided to another device, including being sent as part of a header during a communication, sent upon request, or the like. Moreover, data storage 244 may also be employed to store media content and/or social networking information including text messages, address books, group member list, or the like. At least a portion of the media content and/or event information may also be stored on storage medium 266, such as a disk drive, removable storage, or the like within mobile device 200.

Applications 242 may include computer executable instructions which, when executed by mobile device 200, provide such functions as calendars, contact managers, task managers, transcoders, database programs, word processing programs, screen savers, security applications, spreadsheet programs, games, search programs, and so forth. Applications 242 may further include Message Managers (MM) 245.

MM 245 represents any of a variety of applications configured to transmit, receive, and/or otherwise process messages and other network content, including, but not limited to SMS, MMS, IM, email, VOIP, browsers, or the like, and to enable telecommunication with another user of another networked device. For example, MM 245 may include any of a variety of browser applications, which may be run under control of operating system 241 to enable and manage requesting, receiving, and rendering markup pages such as WAP pages (sometimes referred to as WAP cards), SMGL, HTML, HDML, WML, WMLScript, JavaScript, and the like.

MM 245 may further include an IM application that is configured to initiate and otherwise manage an instant messaging session, including, but not limited to AOL Instant Messenger, Yahoo! Messenger, .NET Messenger Server, ICQ, and the like. In one embodiment, the IM application within MM 245 may be configured to employ a SIP/RTP to integrate IM/VOIP features. For example, the IM application may employ SIMPLE (SIP for Instant Messaging and Presence Leverage), APEX (Application Exchange), Prim (Presence and Instant Messaging Protocol), Open XML-based XMPP (Extensible Messaging and Presence Protocol), more commonly known as Jabber and OMA (Open Mobile Alliance)'s IMPS (Instant Messaging and Presence Service) created specifically for mobile devices, or the like.

MM 245 may also include text messaging application(s) that enables client device 200 to receive and/or send text messages to another device. In one embodiment, the text messaging application(s) may also provide an alerting mechanism that indicates to a user of client device 200 when a text message is received. The text messaging application(s) may also allow the user to compose a text response message, and to send the text response message over a network. The text messaging application(s) may operate to manage SMS text messages, MMS messages, Enhanced Message Service (EMS) messages, or the like, where graphics, video clips, sound files, or other media content may be communicated between client device 200 and another networked device.

In any event, any one or more of the messaging applications within MM 245 may be employed to enable a user of client device 200 to create a group with members for an event, to share media content, and other messages with members of the group, add to access media content or the like, from another networked device, such as a website, server, or the like. In one embodiment, MM 245 may enable a user to send SMS messages, and/or send/receive MMS messages, where the messages may include media content, a link to a remote server where the media content is stored, or the like.

In one embodiment, MM 245 may enable a user to select a namespace ID for another user who is a member of the user's social network. MM 245 may receive a list of member distinctions for the members in the user's social network who are associated with the namespace ID. MM 245 may enable the user to select one of the members from the list to begin an interaction with, using a pull-down list, checkbox list, selection list, or the like. MM 245 may employ interfaces such as those described below in conjunction with FIGS. 6-10 to perform at least some of its actions.

Illustrative Server Environment

Figure 3:
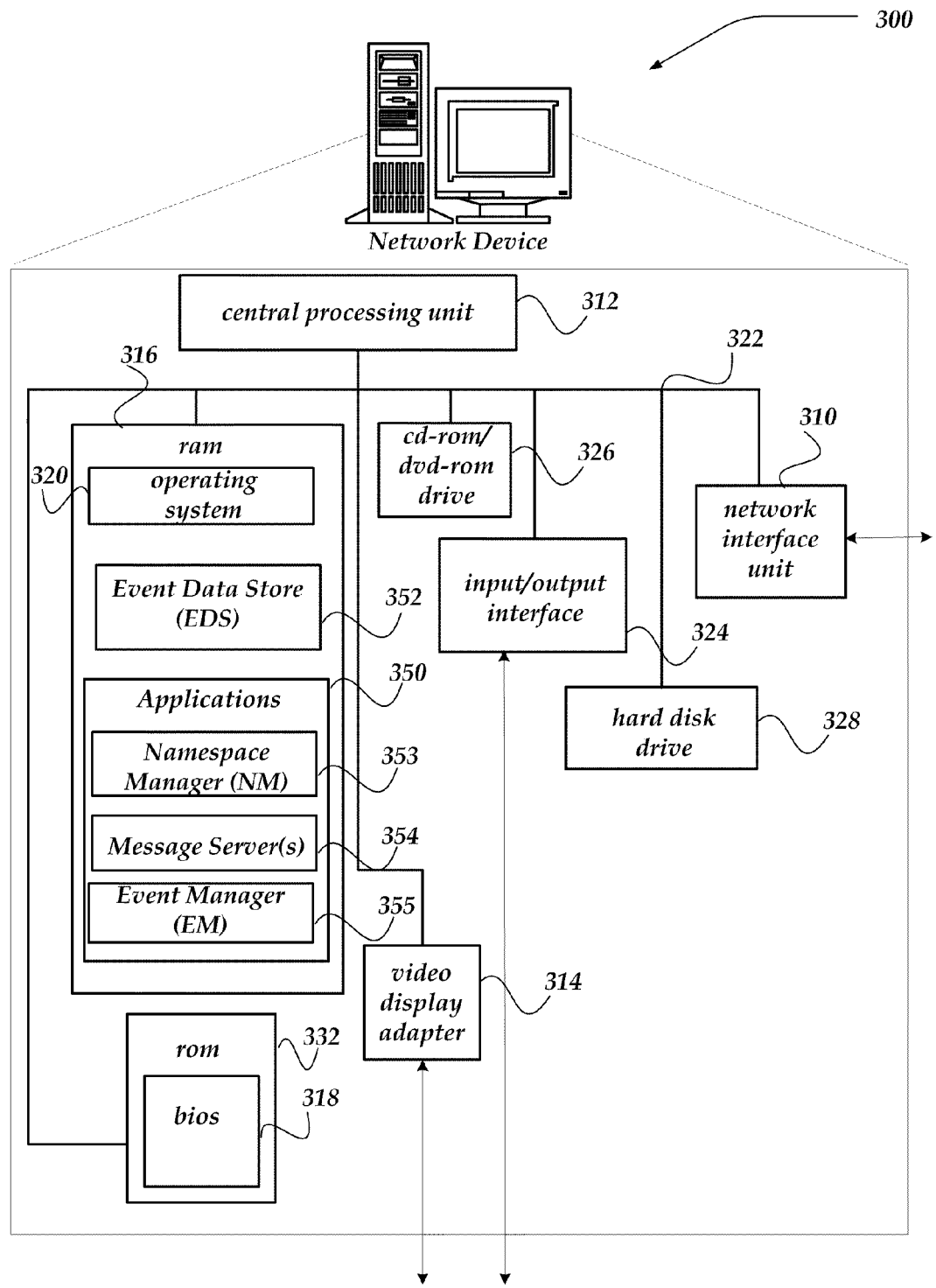
FIG. 3 shows one embodiment of a network device that may be included in a system implementing the invention.

FIG. 3 shows one embodiment of a network device, according to one embodiment of the invention. Network device 300 may include many more components than those shown. The components shown, however, are sufficient to disclose an illustrative embodiment for practicing the invention. Network device 300 may represent, for example, ENS 106 of FIG. 1.

Network device 300 includes processing unit 312, video display adapter 314, and a mass memory, all in communication with each other via bus 322. The mass memory generally includes RAM 316, ROM 332, and one or more permanent mass storage devices, such as hard disk drive 328, tape drive, optical drive, and/or floppy disk drive. The mass memory stores operating system 320 for controlling the operation of network device 300. Any general-purpose operating system may be employed. Basic input/output system ("BIOS") 318 is also provided for controlling the low-level operation of network device 300. As illustrated in FIG. 3, network device 300 also can communicate with the Internet, or some other communications network, via network interface unit 310, which is constructed for use with various communication protocols including the TCP/IP protocol. Network interface unit 310 is sometimes known as a transceiver, transceiving device, or network interface card (NIC).

The mass memory as described above illustrates another type of computer-readable media, namely computer storage media. Computer storage media may include volatile, nonvolatile, removable, and non-removable media implemented in any method or technology for storage of information, such as computer readable instructions, data structures, program modules, or other data. Examples of computer storage media include RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which can be used to store the desired information and which can be accessed by a computing device.

The mass memory also stores program code and data. One or more applications 350 are loaded into mass memory and run on operating system 320. Examples of application programs may include transcoders, schedulers, calendars, database programs, word processing programs, HTTP programs (including XmlHTTPRequest (XHR), Asynchronous JavaScript and XML (AJAX), or JavaScript Object Notation (JSON) programs), customizable user interface programs, IPSec applications, encryption programs, security programs, account management, and so forth. Event Manager (EM) 355 and/or Message Servers 354 may also be included as application programs within applications 350.

Event Data Store (EDS) 352 stores a plurality of received media content. In one embodiment, EDS 352 may be a database, a file structure, or the like. EDS 352 may store event characteristics, including a time of an event, a location of an event, an amount of activity during the event, media content associated with the event, or the like. EDS 352 may also store unique IDs for all users associated with an event, or the like.

Message server(s) 354 include virtually any communication server that may be configured to enable communications between networked devices, including email servers, Simple Mail Transfer Protocol (SMTP) servers, Short Message Peer-to-Peer Protocol (SMPP) servers, SMS servers, various text messaging servers, VOIP servers, IM servers, MMS servers, RSS servers, audio servers, web servers, or the like. Message server(s) 354 may employ EDS 352 to store or otherwise manage media content that may be communicated over a network. In one embodiment, various message server(s) 354 may receive a message from one network device, and, in conjunction with Event Manager (EM) 355, employ information about group membership to store, and/or share the media content to other members over the network. In one embodiment, message server(s) 354, in conjunction with EM 355, store received media content for a group, within EDS 352.

EM 355 is configured to manage events. As such, EM 355 may receive from message server(s) 354 a request for creation, deletion, or modification of a group for an event. EM 355 may employ EDS 352, to create and otherwise manage the membership to the group. EM 355 may further employ various message server(s) 354 to send a message to the members of the group indicating that they are a member to the group.

While message server(s) 354 may be configured to manage and enable sharing of messages, including messages having media content, EM 355 may employ the messages, and related information to determine implicit information about an event. Thus, EM 355 may determine start times, end times, locations of an event, or the like. EM 355 may, in one embodiment, enable the implicit information to be accessed using at least one of the message server(s) 354. Furthermore, EM 355 may provide a user interface for use, in conjunction with various message server(s) 354 to annotate an event, and/or media content within an event at a website, or other location. EM 355 may store the derived implicit or received information as event characteristics in EDS 353, or the like.

Namespace Manager (NM) 353 is configured to store information associated with the social networks of users. In one embodiment, NM 353 may store the social networks as a tree, a graph, a database, a file structure, or the like. The social networks may include members indexed by a namespace ID and/or a unique ID, or the like. In one embodiment, NM 353 may determine relationship information between members (e.g. users) of a group associated with an event. NM 353 may receive membership information for the group from EM 355. In one embodiment, for a member in the group, NM 353 may select the member's social network. NM 353 may add at least one member of the group to the selected social network. Thereby, NM 353 may modify (e.g. expand) the user's social network.

In one embodiment, NM 353 may map a unique ID associated with a user to a namespace ID that may not be unique. In this way, NM 353 may determine a plurality of unique IDs associated with a possibly non-unique namespace IDs. For at least one of the plurality of unique IDs, NM 353 may determine member distinctions such as identification information. Such identification information may include a name (e.g. user name, first name, last name), a phone number, a network address, or the like.

NM 353 may also determine member distinctions based on event characteristics stored in EDS 352. For example, NM 353 may associate a user's unique ID and/or namespace ID with an event. NM 353 may store this association with event characteristics in EDS 352, or the like. The event characteristics may be indexed by the unique user ID and/or namespace ID, for later retrieval. NM 353 may employ a process such as described below in conjunction with FIGS. 4, 5A, and 5B to perform at least some of its actions.

Generalized Operation

Figure 4:
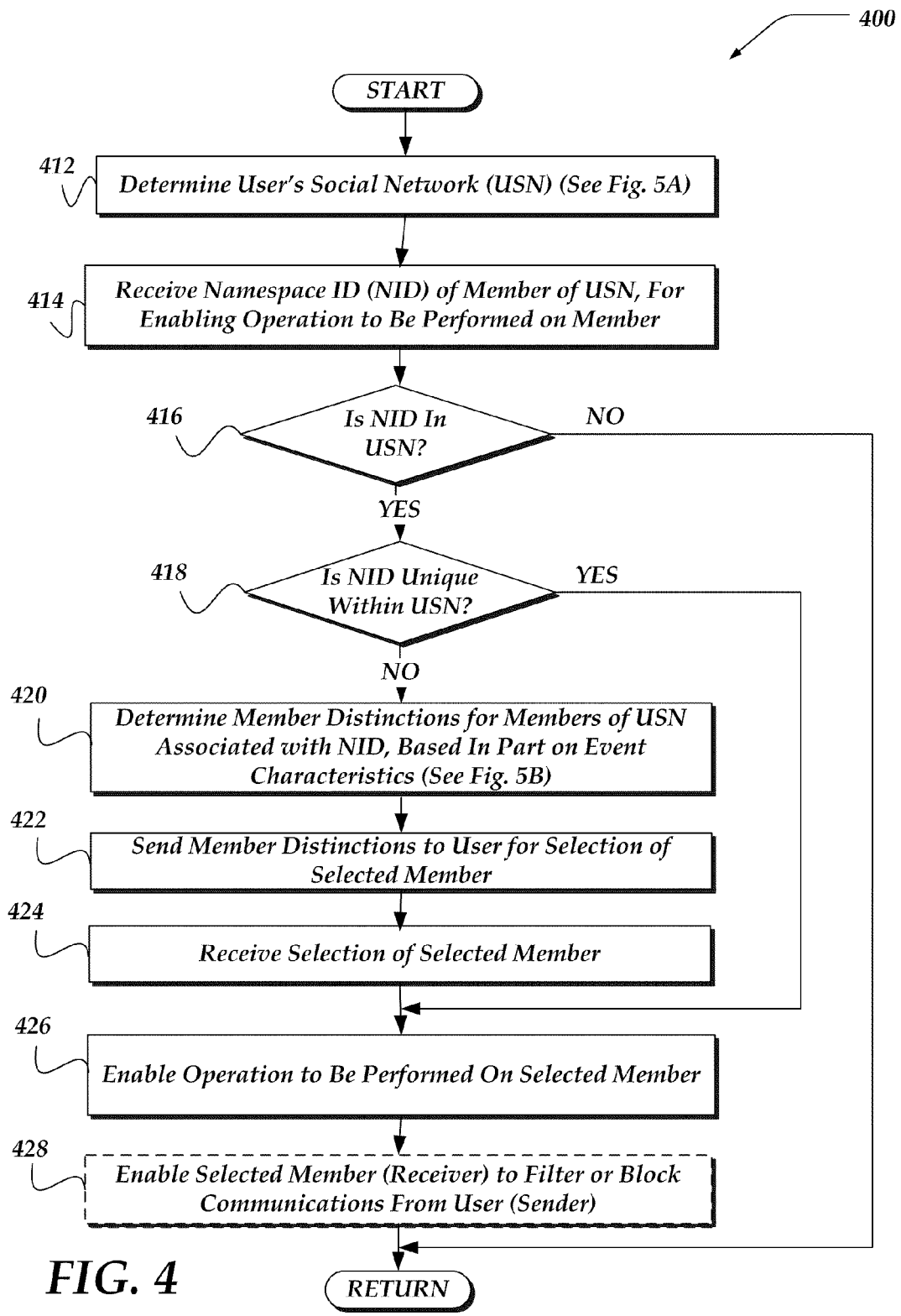
FIG. 4 illustrates a logical flow diagram generally showing one embodiment of a process for determining a user associated with a namespace ID.
Figure 5A:
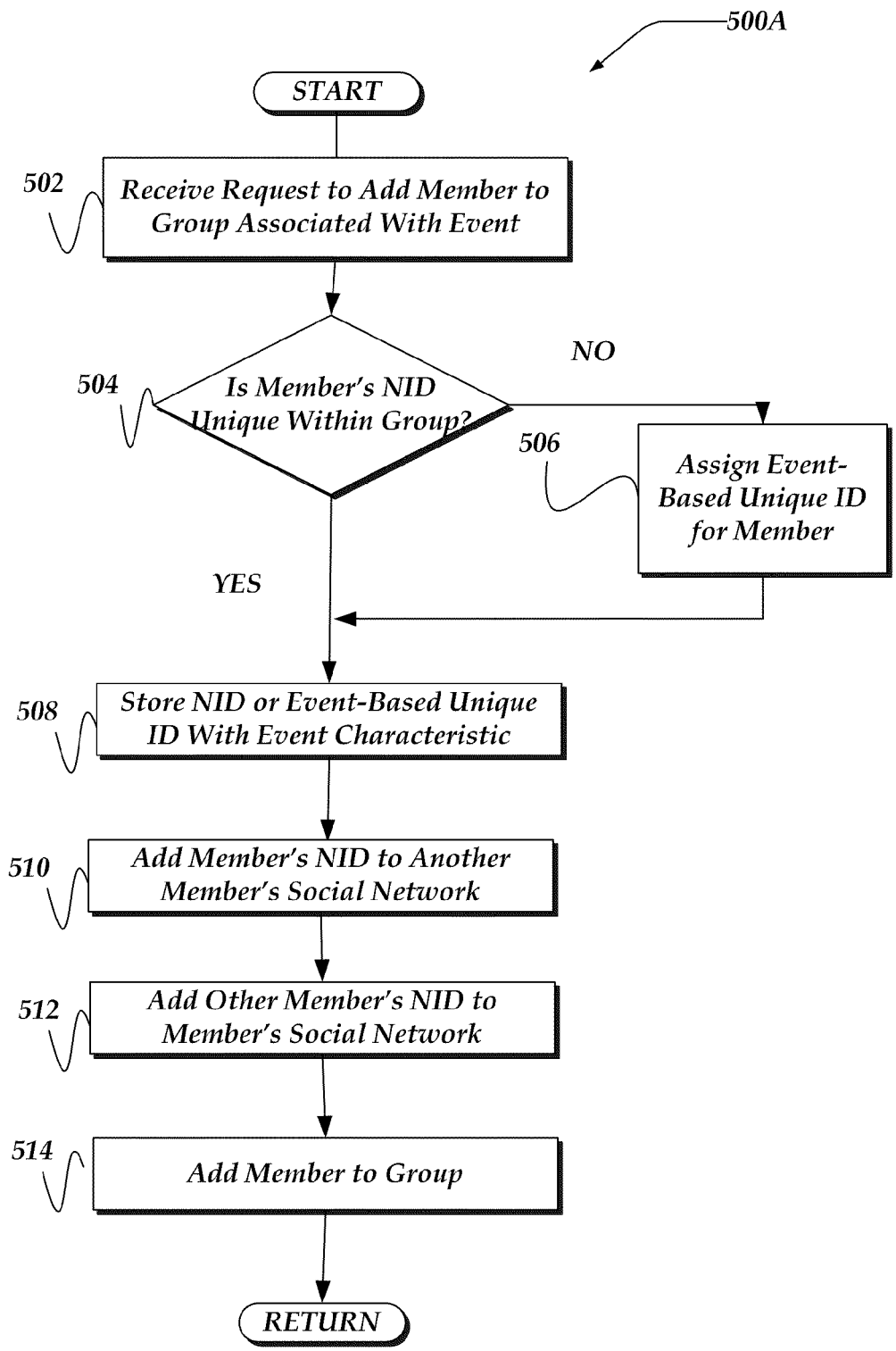
FIG. 5A illustrates a logical flow diagram generally showing one embodiment of a process for determining characteristics of an event and for determining a social network of a member associated with the event.
Figure 5B:
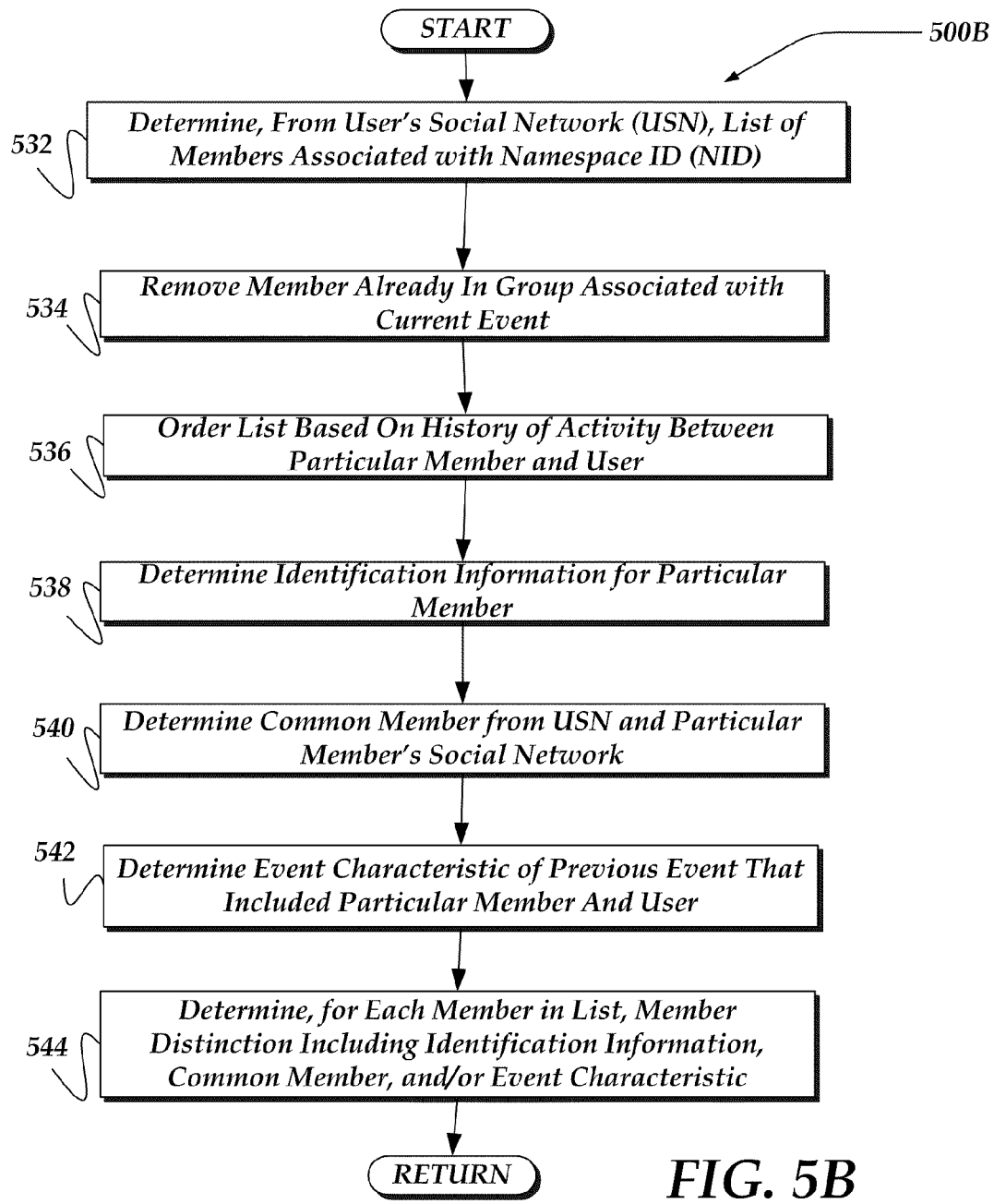
FIG. 5B illustrates a logical flow diagram generally showing one embodiment of a process for determining member distinctions for members associated with a namespace ID.

The operation of certain aspects of the invention will now be described with respect to FIGS. 4, 5A, and 5B. FIGS. 4, 5A, and 5B provide logical flow diagrams of certain aspects. FIG. 4 illustrates a logical flow diagram generally showing one embodiment of a process for determining a user associated with a namespace ID. Process 400 of FIG. 4 may be implemented, for example, within ENS 106 of FIG. 1.

Process 400 begins, after a start block, at block 412, where a user's social network (USN) is determined. One embodiment of operations of block 412 is described in more detail in conjunction with FIG. 5A. Briefly, however, the USN may be determined by being created, modified, or otherwise populated. The USN may be determined based on a contact list of the user, an automatically created social network of the user, or the like. In one embodiment, the USN may be determined based on the user's membership in a group (whether associated or unassociated with an event). The group may be associated with an event and/or the relationship between the members of the group. In one embodiment, the relationship includes the user inviting the member to the event, the member inviting the user to the event, the member and the user being in the same event, or the like.

These members are the USN's first-degree of separation members—e.g. members separated from the user by one degree of separation. In one embodiment, the USN may also include other members who are separated from the user by more than one degree of separation. For example, the other members may include those who were not in the same event as the user, but who were in the same event with one of the first-degree members.

Processing next flows to block 414, where a NID of a member within the USN is received, for enabling an operation to be performed based on information about the member. In one embodiment, the NID may be received from a device associated with the user, over a network connection, or the like. Processing next flows to decision block 418.

At decision lock 418, it is determined whether the NID is included in the USN. The NID is included in the USN if the NID is associated with a member in the USN. If the NID is not in the USN, then processing returns to a calling process for further processing. Otherwise, processing continues to decision block 418.

At decision block 418, it is determined whether the NID is unique within the USN. In one embodiment, the NID is unique if there is only one member in the USN associated with the NID. If it is determined that the NID is unique, then processing continues to block 426. If it is determined that the NID is non-unique (e.g. a plurality of members within the USN is associated with the NID), then, processing continues to block 420.

At block 420, a member distinction is determined for each of a plurality of members in the USN who are associated with the NID. The member distinctions may be based in part on event characteristics. One embodiment of operations of block 420 is described in more detail in conjunction with FIG. 5B. Briefly, however, the member distinctions include information to distinguish the members. In one embodiment, the member distinctions include member identification information, a common friend (e.g., a person included in both the member and the user's social network), event characteristics of a common event which includes the user and the member, an event-based unique ID associated with the member for the common event, or the like.

Processing next flows to block 422 where the member distinctions are sent to the user for the user to make a selection of the member. In one embodiment, the member distinctions are sent over a network, and to a device associated with the user. In one embodiment, the user may select one of the members associated with one of the member distinctions.

Processing next flows to block 424, where based on the selection, information about a selected member is received. In one embodiment, the information about the selected member may include a unique ID, address (e.g. SMS, IM, email), or the like, associated with the selected member and included within the selection. Processing next continues to block 426.

At block 426, an operation is enabled to be performed based on information about the selected member. The operation may include enabling a communication between the user and the selected member or otherwise addressing the selected member, adding the selected member to an event that is associated with the user, providing information to the user about the selected member, or virtually any operation that may be performed on, with, or to the selected member based on the information about the selected member. Communications between the user and selected member include sending IM, SMS, email messages, or the like.

Processing next flows to block 428. Block 428 may be optional and may be performed in the case where the enabled operation is a communication. At block 428, the selected member (e.g. receiver) may filter or even block communications from the user (e.g. the sender). In one embodiment, a message from the sender may be sent over an associated mode of communication, if the receiver has associated the sender with the associated mode of communication. In one embodiment, the message may be sent over the receiver's preferred mode of communication, if the sender is un-associated with the associated mode of communication. The preferred mode of communication may be determined by the receiver (e.g. concurrently with the message being received or even before the message has been received). In one embodiment, the preferred mode of communication may be determined to be specific for a sender of a message. Processing then returns to a calling process for further processing.

FIG. 5A illustrates a logical flow diagram generally showing one embodiment of a process for determining characteristics of an event and for determining a social network of a member associated with the event. Process 500A of FIG. 5A may be implemented, for example, within ENS 106 of FIG. 1.

Process 500A begins, after a start block, at decision block 502, where a request to add a member to a group associated with an event is received. Processing next continues to decision block 504.

At decision block 504, it is determined whether the member's NID is unique within the group. The member's NID is unique if other members of the group are not associated with the same NID. If the member's NID is unique, then processing flows to block 508. If the member's NID is not unique, then processing flows to block 506.

At block 506, an event-based unique user ID is created for the user. Such event-based unique user ID may be created by appending a unique portion to the NID. The unique portion may include a number, a character, a symbol, or the like. Processing then flows to block 508.

At block 508, the NID or the event-based unique user ID are stored as a characteristic of the event. The stored NID or stored event-based ID may be used to distinguish members of the group in subsequent operations, such as in determining member distinctions, or the like.

Processing continues to block 510, where the member's NID is added to a social network of another member of the group. Processing then continues to block 512, where the other member's NID is added to the member's social network. The social networks determined at blocks 510 and 512 may be the same as the USN determined at block 412 of FIG. 4.

Processing then continues to block 514, where the member is added to the group associated with the event. Thus, the member becomes included in the event, and may be enabled to participate in communicating and sharing text/media messages between members of the group. Processing then returns to a calling process for further processing.

FIG. 5B illustrates a logical flow diagram generally showing one embodiment of a process for determining member distinctions for members associated with a namespace ID. Process 500B of FIG. 5B may be implemented, for example, within ENS 106 of FIG. 1.

Process 500B begins, after a start block, at decision block 532, where a list of members associated with a NID is determined, wherein the members are selected from a USN/social network of a user. Processing next continues to block 504.

At block 534, a member who is already in a group associated with a current event is removed from the list. The current event may be an event created by the user, associated with the user, or the like. In one embodiment, the member is determined to be in the group based on a database operation, a matching of uniquely identifying information (e.g. a unique ID) associated with the member and another member in the group, or the like. If the member is determined to be in the group, then the member is removed from the list.

Processing next continues to block 536, where the list is ordered based on a history of activity between a particular member and the user. In one embodiment, the history of activity may be an activity value representing an amount of messages exchanged between the particular member and the user, an amount of times the particular member and the user have been in the same event, or the like. In one embodiment, the list may be sorted from highest activity value to lowest activity value.

Processing next continues to block 538, where identification information for a particular member is determined. Identification information may include a name, birth date, social security number, mother's maiden name, address, a portion of a phone number, or the like.

Processing next continues to block 540, where a common member from the USN and from a particular member's social network is determined. The common member may be determined by taking an intersection of the USN and the particular member's social network. The common member may represent a common friend, acquaintance, co-worker, or the like.

Processing next continues to block 542, where an event characteristic of a pervious event is determined, wherein the pervious event includes a particular member and the user. In one embodiment, the previous event is associated with a group that includes the particular member and the user. In one embodiment, the previous event may be the most recent event attended by both the particular member and the user. The event characteristic may include a time of the event, a name of the event, a location of the event, a content media shared during the event, or the like. In one embodiment, the event characteristic may be based on implicit information determined from activity within the event, such as a flow of media content sent between members, a text message sent between members, or the like. In one embodiment, the event characteristic may include an event-based unique ID associated with a particular member for the previous event.

Processing next continues to block 544, where member distinctions are determined for each member in the list. The member distinctions may include any combinations of identification information, a common member, and/or event characteristics. In one embodiment, common information shared between a plurality of member distinctions may be removed. In one embodiment, such shared common information may include the same first name, the same event characteristics, the same time the plurality of members met the user, or the like. Thus, the member distinctions provide information for the user to distinguish/disambiguate the members from each other. Processing then returns to a calling process for further processing.

Accordingly, blocks of the flowchart illustration support combinations of means for performing the specified actions, combinations of steps for performing the specified actions and program instruction means for performing the specified actions. It will also be understood that each block of the flowchart illustration, and combinations of blocks in the flowchart illustration, can be implemented by special purpose hardware-based systems which perform the specified actions or steps, or combinations of special purpose hardware and computer instructions.

Illustrative Use Cases

FIGS. 6-7 shows embodiments of use case examples illustrating the operations of the present invention. FIG. 6 shows one embodiment of a use case illustrating enabling an operation to be performed on, with, or to a member of a social network associated with a namespace ID based on information about the member. While example 600 shows the action to be performed on, with, or to the selected member as adding the member to an event, any other action may be enabled, such as enabling an SMS, email, or IM communication between the user and the selected member, without departing from the spirit of the invention.

Interface 601 of example 600 illustrates that, in one embodiment, a message to create an event may be sent to an event/name space server (ENS) such as ENS 106 of FIG. 1, or the like. The message may, in one embodiment, employ SMS, however, the invention is not so limited, and any of a variety of communication message services may also be employed. As shown, at interface 601, the user may request a "new" event to be created by the name "partygroup." The user may then be added to the "partygroup" event. After receiving the request to create the event, the ENS may determine the user's social network (USN), similar to the process described in block 412 of FIG. 4.

At interface 602, the user receives an instruction on how to add other members to the group associated with the event.

At interface 603, the user adds a member associated with the phone number "4155551234," and another member associated with the NID "John." As shown, the NID "John" may be associated with more than one member of the USN. Interface 603 illustrates an embodiment of a possible communication from a user that might transpire during block 414 of FIG. 4. After receiving the NID "John," the ENS may determine whether the NID is unique within the USN associated with the user, as described in blocks 416, and 418 of FIG. 4. The ENS may determine member distinctions 611-613 and may send member distinctions 611-613 to the user, as described in blocks 420 and 422. The member distinctions may also be determined by process 500B of FIG. 5, as described above.

Interface 604 shows a display of the received member distinctions 611-613. As shown, the temporary unique ID "John1" and "John2," associated with the event "Dinner" are included in the member distinctions. Also, other event characteristics, including the name of the event ("Dinner") and the time of the event ("Aug. 10, 2006") are included. Identification information (e.g. the name "J. Doe") for "John2" are also included. A common friend, "Matt" is also included. Interface 604 enables the user to select one of the members associated with one of the member distinctions 611-613.

Interface 605 shows the user making the selection (e.g. "1") for one of the members based on the member distinctions 611-613. The selection is sent to the ENS for further processing. For example, ENS may perform blocks 424, 426, and/or 428 of FIG. 4.

FIG. 7 shows one embodiment of another use case illustrating enabling an operation to be performed on, with, or to a member of a social network associated with a namespace ID based on information about the member. Example 700 of FIG. 7 is a continuation of example 600 of FIG. 6.

Interface 701 shows the user adding a member associated with the NID "John." The NID "John" might be sent to an ENS. In response, the ENS replies with member distinctions 721-722.

Interface 702 shows a display of member distinctions 721-722 to enable the user to select a member. Member distinctions 721-722 are different from member distinctions 611-613 of FIG. 6 because the member associated with "John from Bookclub, Matt's friend" is already associated the current event. Thus the member distinction associated with this member has been removed from member distinctions 721-722.

Interface 703 shows the user making the selection (e.g. "2") for one of the members based on the member distinctions 721-722. As shown, another user associated with the namespace ID "John" is added to the group associated with the event.

Interface 706 shows two members, "John1" and "John2," of the group associated with the event "partygroup." The two members shares the same namespace ID, "John." "John1" and "John2" are two event-based unique IDs for the event. Unique portions of the IDs (e.g. "1" and "2") are appended to the namespace ID to generate event-based unique IDs. Also, interface 702 shows determined event characteristics, including start time 706, end time 707, location 708, and shared media associated with the event.

Illustrative User Interfaces

Figure 8:
FIG. 8 shows one embodiment of a user interface for identifying users associated with namespace IDs.
Figure 9:
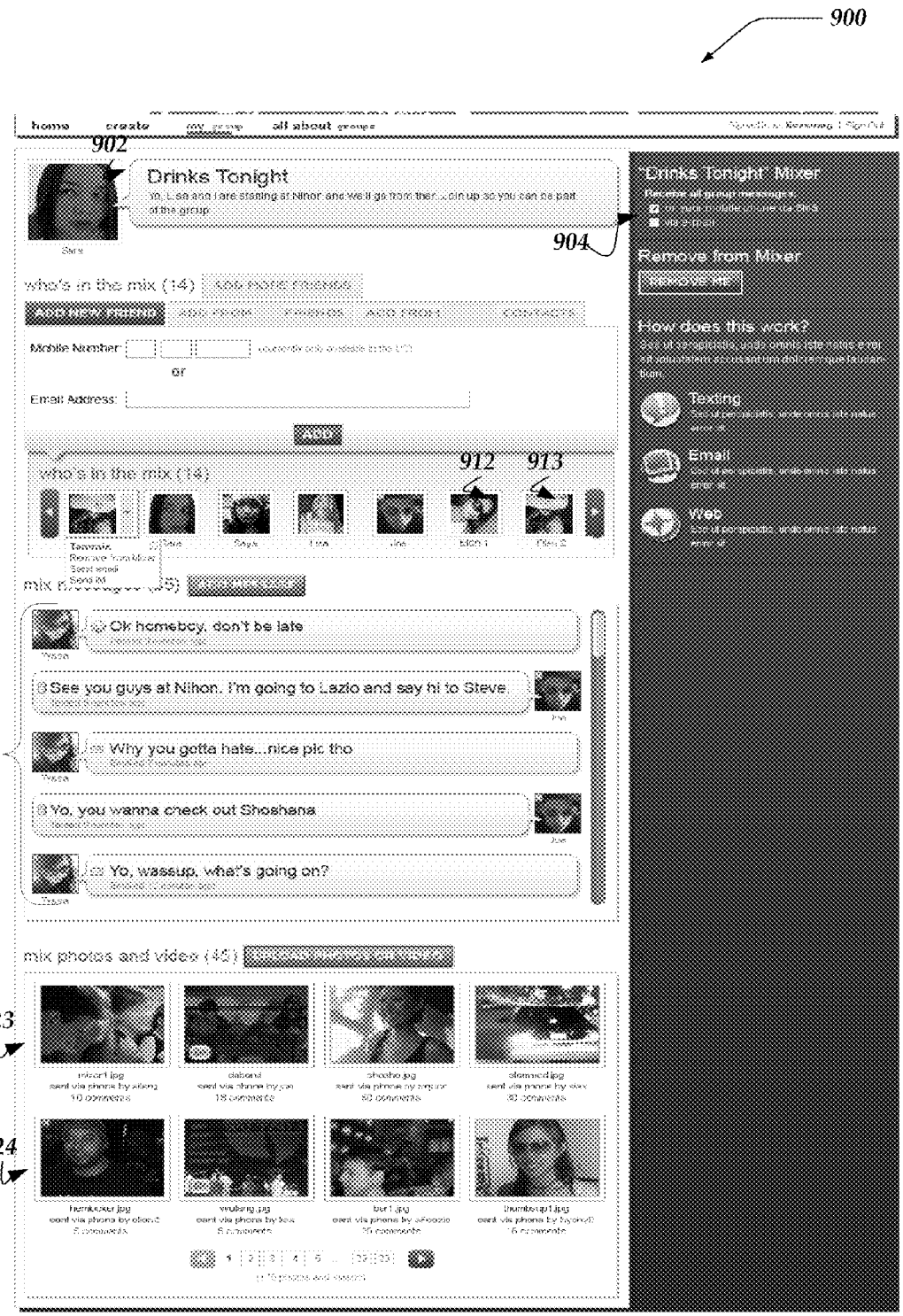
FIG. 9 shows one embodiment of a user interface for reviewing and sharing media between users associated with namespace IDs.
Figure 10:
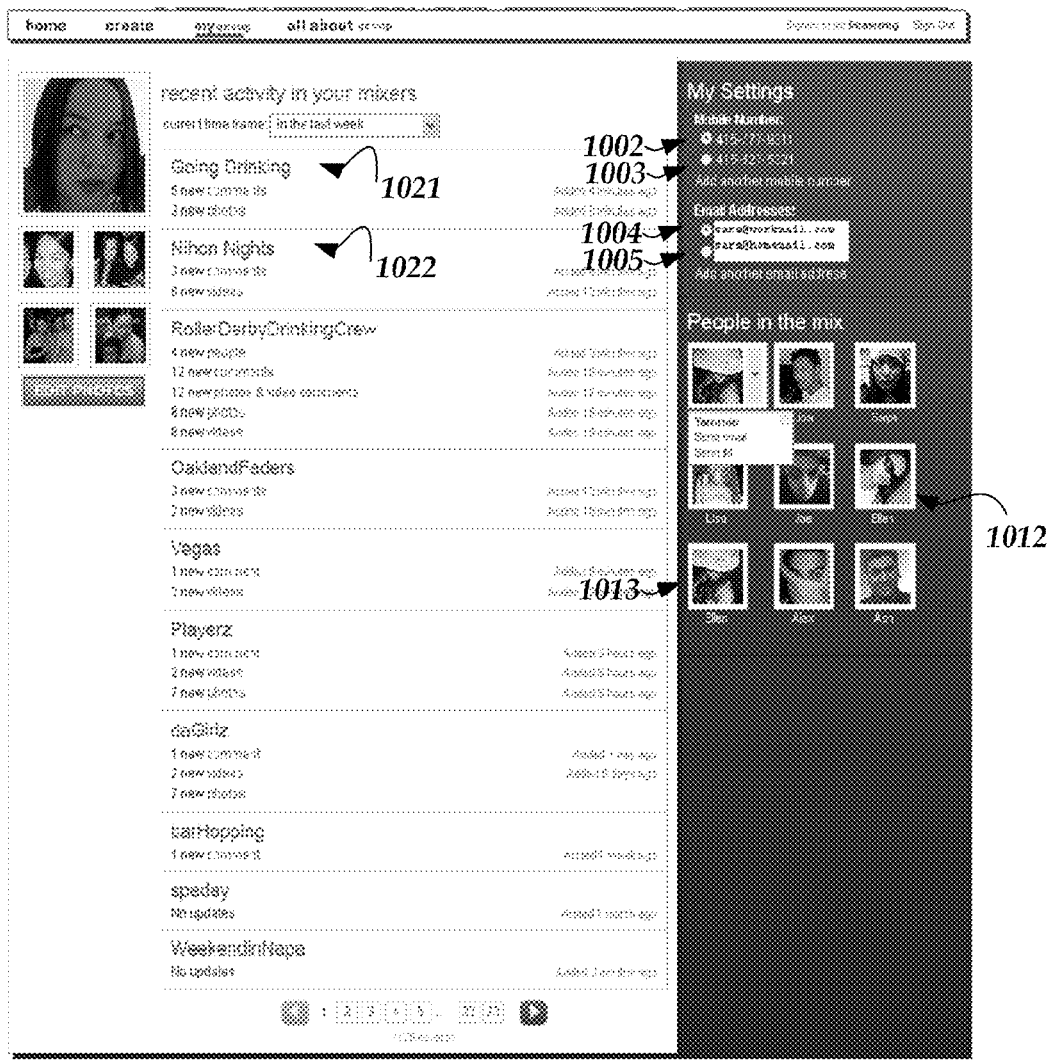
FIG. 10 shows one embodiment of a user interface for reviewing media shared by users associated with namespace IDs, in accordance with the present invention.

FIGS. 8-10 show embodiments of user interfaces for managing events and interactions between users associated with namespace IDs. A client device, such as client device 101 of FIG. 1, respectively, may enable user interfaces 800, 900 and 1000 of FIGS. 8, 9, and 10.

FIG. 8 shows one embodiment of a user interface for identifying users associated with namespace IDs. Display 800 shows a user creating an event associated with title 802-"Drinks Tonight." The user's social network includes at least two members 812-813 associated with the same namespace ID—"Ellen." The group associated with the event also includes the members 812-813. Two temporary unique IDs 822-823 ("Ellen1" and "Ellen2") are associated with the members and the group/event. Drop-down list 804 shows a mechanism for enabling a communication with another user.

FIG. 9 shows one embodiment of a user interface for reviewing and sharing media between users associated with namespace IDs. Display 900 shows a history of activity associated with the event having title 902—"Drinks Tonight." Members 912-913 have been assigned temporary unique IDs for this event, as described above. Shared content 923 is associated with member 912. Shared content 924 is associated with member 913. Shared messages 920 show a history of activity between participants in the event. Thus, shared messages 920, the temporary unique IDs for members 912-913, and/or other information shown on display 900 may be used to determine the event characteristics of this event. Display 900 also shows preferred mode of communication 904 used to contact the user. As shown, the user has identified "mobile phone via SMS" as the preferred mode of communication.

FIG. 10 shows one embodiment of a user interface for reviewing media shared by users associated with namespace IDs. Display 1000 shows a history of events associated with a user. For example, events 1021-1022 are displayed. Phone numbers 1002-1003 are associated with the user. Emails 1004-1005 are also associated with the user. In one embodiment, the user may associate a mode of communication with a member of the user's social network. For example, the associated mode of communication may be one of phone numbers 1002-1003 and/or one of emails 1004-1005. Also shown, members 1012-1013 of the user's social network are displayed. Members 1012-1013 share the same namespace ID.

The above specification, examples, and data provide a complete description of the manufacture and use of the composition of the invention. Since many embodiments of the invention can be made without departing from the spirit and scope of the invention, the invention resides in the claims hereinafter appended.

What is claimed as new and desired to be protected by Letters Patent of the United States is:

1. A method comprising:
   determining, by a processor, an identifier that is associated with at least one member in a social network of a user and is non-unique within the social network;
   determining, by the processor, a plurality of member distinctions for each member associated with the determined identifier, the plurality of member distinctions based in part on an event characteristic of an event that involves a previously attended social gathering of at least one member in the social network and the user and is associated with an event group created specifically for the event, the event characteristic comprising a time that the previously attended social gathering occurred and a location at which the previously attended social gathering occurred, the event characteristic including an event-based unique identifier (ID) associated with the selected member;
   receiving, by the processor from the user, selection of a member associated with the determined identifier based at least on the member distinctions; and
   performing, by the processor, an operation based on information about the selected member that is based on the member distinctions.

2. The method of claim 1, wherein determining the member distinctions further comprises determining, for each member of the plurality of members, at least one of: a number of communications with the user and a common member within the social network of the user and within a social network of the each member.

3. The method of claim 1, further comprising determining the social network of the user based on a relationship between members of an event, wherein the event includes the user.

4. The method of claim 1, wherein the user receives the member distinctions and sends the selection of the member using a mobile device.

5. The method of claim 1, wherein performing the operation based on the information further comprises sending a message from the user over the selected member's preferred mode of communication.

6. A network device comprising:
a transceiver to send and receive data over a network; and
a processor that is configured to execute instructions, comprising:
determining an identifier that is associated with at least one member in a social network of a user and is non-unique within the social network;
determining a plurality of member distinctions for each member associated with the determined identifier, the plurality of member distinctions based in part on an event characteristic of an event that involves a previously attended social gathering of at least one member in the social network and the user and is associated with an event group created specifically for the event, the event characteristic comprising a time that the previously attended social gathering occurred and a location at which the previously attended social gathering occurred, the event characteristic including an event-based unique identifier (ID) associated with the selected member;
receiving, from the user, selection of a member associated with the determined identifier based at least on the member distinctions; and
performing an operation based on information about the selected member that is based on the member distinctions.

7. The network device of claim 6, wherein determining the member distinctions comprises determining, for each member of the plurality of members, at least one of: a number of communications with the user and a common member within the social network of the user, wherein the common member is included within a social network of the each member.

8. The network device of claim 6, wherein the operation further comprises:
receiving information about the selected member based on the plurality of members distinctions;
enabling the user to address the selected member based on the received information about the selected member;
enabling the user to send a group message, wherein the selected member is at least one of recipient of the group message;
enabling a message from the user to be sent directly to the selected member over a preferred mode of communication; and
enabling information about the user to be sent to the selected member.

9. A system comprising:
a processor;
a storage medium for tangibly storing thereon program logic for execution by the processor, the stored program logic comprising:
identifier determining logic executed by the processor for determining an identifier that is associated with at least one member in a social network of a user and is non-unique within the social network;
member distinction determining logic executed by the processor for determining a plurality of member distinctions for each member associated with the determined identifier, the plurality of member distinctions based in part on an event characteristic of an event that involves a previously attended social gathering of at least one member in the social network and the user and is associated with an event group created specifically for the event, the event characteristic comprising a time that the previously attended social gathering occurred and a location at which the previously attended social gathering occurred, the event characteristic including an event-based unique identifier (ID) associated with the selected member;
selecting logic executed by the processor for receiving, from the user, selection of a member associated with the determined identifier based at least on the member distinctions; and
performing logic executed by the processor for performing an operation based on information that is based on the member distinctions about the selected member.

10. The system of claim 9, wherein the member distinction determining logic comprises logic executed by the processor for determining, for each member of social network, at least one of: a number of communications with the user and a common member within the social network of the user and within a social network of each member.

11. The system of claim 9, wherein the selection includes a unique identifier (ID) associated with the selected member.

12. The system of claim 9, further comprising communicating logic executed by the processor for enabling a communication between the user and the selected member based on the information about the selected member.

13. A non-transitory computer readable storage medium having processor executable instructions for managing a communication over a network, the processor executable instructions configured to enable a processor to execute instructions, comprising:
determining, by the processor, an identifier that is associated with at least one member in a social network of a user and is non-unique within the social network;
determining, by the processor, a plurality of member distinctions for each member associated with the determined identifier, the plurality of member distinctions based in part on an event characteristic of an event that involves a previously attended social gathering of at least one member in the social network and the user and is associated with an event group created specifically for the event, the event characteristic comprising a time that the previously attended social gathering occurred and a location at which the previously attended social gathering occurred, the event characteristic including an event-based unique identifier (ID) associated with the selected member;
receiving, by the processor from the user, selection of a member associated with the determined identifier based at least on the member distinctions; and
performing, by the processor, an operation based on information about the selected member that is based on the member distinctions.

14. A non-transitory computer readable storage medium of claim 13, further comprising other processor executable instructions configured to enable the processor to execute instructions comprising: determining the social network of the user based on a relationship between members of an event, wherein the event includes the user.

15. A non-transitory computer readable storage medium of claim 13, wherein the user receives the member distinctions, and provides the selection of the member using a mobile device.

16. A non-transitory computer readable storage medium of claim 13, wherein enabling the operation to be performed based on information further comprises:
sending a message from the user over an associated mode of communication, if the user is associated with the associated mode of communication for the selected member; and
sending a message from the user over the selected member's preferred mode of communication, if the user is un-associated with the associated mode of communication.

17. A mobile device comprising:
a transceiver to send and receive data over a network; and
a processor that is operative to execute instructions, comprising:
determining an identifier that is associated with at least one member in a social network of a user and is non-unique within the social network;
determining a plurality of member distinctions for each member associated with the determined identifier, the plurality of member distinctions based in part on an event characteristic of an event that involves a previously attended social gathering of at least one member in the social network and the user and is associated with an event group created specifically for the event, the event characteristic comprising a time that the previously attended social gathering occurred and a location at which the previously attended social gathering occurred, the event characteristic including an event-based unique identifier (ID) associated with the selected member;
receiving, from the user, selection of a member associated with the determined identifier based at least on the member distinctions; and
performing an operation based on information about the selected member that is based on the member distinctions.

18. The mobile device of claim 17, wherein the plurality of member distinctions is determined based on at least one of: an amount of communication with the user and a common member within the social network of the user and within a social network of the each member.

19. The mobile device of claim 17, wherein the operation includes a communication of an instant message (IM) message, an email message, or a short message service (SMS) message.

* * * * *